(12) United States Patent
Zhao et al.

(10) Patent No.: US 12,449,713 B2
(45) Date of Patent: Oct. 21, 2025

(54) LOW FREQUENCY WAVE GENERATION VIA OPTICAL FREQUENCY DIVISION

(71) Applicant: The Trustees of Columbia University in the City of New York, New York, NY (US)

(72) Inventors: Yun Zhao, New York, NY (US); Jae K Jang, New York, NY (US); Yoshitomo Okawachi, River Edge, NJ (US); Bok Young Kim, New York, NY (US); Alexander L Gaeta, New York, NY (US); Michal Lipson, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 193 days.

(21) Appl. No.: 18/309,572

(22) Filed: Apr. 28, 2023

(65) Prior Publication Data

US 2024/0402571 A1  Dec. 5, 2024

Related U.S. Application Data

(60) Provisional application No. 63/337,237, filed on May 2, 2022.

(51) Int. Cl.
*G02F 1/39* (2006.01)
*G02F 1/01* (2006.01)

(52) U.S. Cl.
CPC ............ *G02F 1/395* (2013.01); *G02F 1/0147* (2013.01); *G02F 2203/15* (2013.01); *G02F 2203/21* (2013.01)

(58) Field of Classification Search
CPC .............................. G02F 1/0147; G02F 1/395
See application file for complete search history.

(56) References Cited

U.S. PATENT DOCUMENTS

| | | | |
|---|---|---|---|
| 7,982,944 B2 * | 7/2011 | Kippenberg | G02F 1/39 372/32 |
| 9,057,927 B2 * | 6/2015 | Hu | G02F 1/3551 |
| 2015/0236784 A1 * | 8/2015 | Vahala | H03B 17/00 398/115 |

(Continued)

OTHER PUBLICATIONS

Zhao, Y., Jang, J.K., Beals, G.J. et al. All-optical frequency division on-chip using a single laser. Nature 627, 546-552 (2024). (Year: 2024).*

(Continued)

*Primary Examiner* — Rhonda S Peace
(74) *Attorney, Agent, or Firm* — BakerHostetler

(57) ABSTRACT

Systems, methods, and devices for generating tunable low frequency signals, such as microwave and radiofrequency signals are disclosed. A first waveguide in optical communication with a first ring resonator can be configured to receive a light input and generate frequencies via optical parametric oscillation. A second waveguide with second ring resonator can receive the frequencies and optically synchronize the frequencies via optical frequency division to generate a low frequency signal. One or more heating elements can be connected to each ring resonator to tune the resonators and reduce noise associated with the low frequency signal.

20 Claims, 19 Drawing Sheets
(19 of 19 Drawing Sheet(s) Filed in Color)

(56) References Cited

U.S. PATENT DOCUMENTS

2024/0402571 A1\* 12/2024 Zhao ................ G02F 1/3536

OTHER PUBLICATIONS

Arafin et al., "Optical synthesis using Kerr frequency combs," 2017 Joint Conference of the European Frequency and Time Forum and IEEE International Frequency Control Symposium (EFTF/IFCS), 2017, pp. 534-537, doi: 10.1109/FCS.2017.8088950.
Bao et al., "Soliton repetition rate in a silicon-nitride microresonator", Opt. Lett. 42, 759 (2017).
Bao et al., "Nonlinear conversion efficiency in Kerr frequency comb generation," Opt. Lett. 39, 6126 (2014).
Bothwell et al., "JILA Srl optical lattice clock with uncertainty of 2.0 x 10−18", Metrologia 56, 065004 (2019).
Chembo et al., "Modal expansion approach to optical-frequencycomb generation with monolithic whispering-gallery-mode resonators", Phys. Rev. A 82, 033801 (2010).
Coen et al., "Universal scaling laws of kerr frequency combs", Opt. Lett. 38, 1790 (2013).
Coillet et al., "On the robustness of phase locking in kerr optical frequency combs", Opt. Lett. 39, 1529 (2014).
Courtois et al., "Phase diffusion and quantum noise in the optical parametric oscillator: A semiclassical approach", J. Mod. Opt. 38, 177 (1991).
Di osi, "Laser linewidth hazard in optomechanical cooling", Phys. Rev. A 78, 021801 (2008).
Djordjevic et al., "CMOS-compatible, athermal silicon ring modulators clad with titanium dioxide", Opt. Express 21, 13958 (2013).
Do et al., "Wideband tunable microwave signal generation in a silicon-micro-ring-based optoelectronic oscillator", Sci. Rep., 2020, 10, 1.
Domeneguetti et al., "Parametric sideband generation in CMOS-compatible oscillators from visible to telecom wavelengths," Optica 8, 316 (2021).
Domenico et al., "Simple approach to the relation between laser frequency noise and laser line shape", Appl. Opt. 49, 4801 (2010).
Drake et al., "Thermal decoherence and laser cooling ofKerr microresonator solitons," Nat. Photon. 14, 480 (2020).
Fortier et al., "Generation of ultrastable microwaves via optical frequency division", Nat. Photonics, 2011, vol. 5, pp. 425-429.
Gartner et al., "Bandwidth and conversion efficiency analysis of dissipative Kerr soliton frequency combs based on bifurcation theory", Phys. Rev. A 100, 033819 (2019).
Godey et al., "Stability analysis of the spatiotem-poral lugiato-lefever model for kerr optical frequency combs in the anomalous and normal dispersion regimes", Phys. Rev. A 89, 063814 (2014).
Gorodetksy et al., "Deter-mination of the vacuum optomechanical coupling rate using frequency noise calibration", Opt. Express 18, 23236 (2010).
Guha et al., "Athermal silicon microring resonators with titanium oxide cladding", Opt. Express 21, 26557 (2013).
Gundavarapu et al., "Sub-hertz fundamental linewidth photonic integrated Brillouin laser", Nat. Photonics 13, 60 (2019).
He et al., "Experimental test of a W-band gyro-TWA for cloud radar applications", 2016 46th European Microwave Conf. (EuMC), IEEE, Piscataway, NJ, 1099-1102.
Huang et al., "Thermorefractive noise in silicon-nitride microresonators", Phys. Rev. A 99, 061801(R) (2019).
Huang et al., J. Bowers, "High-power sub-kHz linewidth lasers fully integrated on silicon," Optica 6, 745 (2019).
Ivanov et al., "Ultra-low-noise microwave oscillator with advanced phase noise suppression system", IEEE Microwave Guided Wave Lett. 6, 312 (1996).
Jang et al., "Conversion efficiency ofsoliton Kerr frequency combs," accepted for publication in Opt. Lett. (2021).
Jang, et al., M. Lipson, and A. L. Gaeta, "Observation of Arnold tongues in coupled soliton Kerr frequency combs," Phys. Rev. Lett. 123, 153901 (2019).
Jang, et al., M. Lipson, and A. L. Gaeta, "Synchronization of coupled optical microresonators," Nat. Photon. 12, 688 (2018).
Joshi et al., "Thermally controlled comb generation and soliton modelocking in microresonators", Opt. Lett. 41, 2565 (2016).
Kalubovilage et al., "Ultra-low phase noise microwave generation with a free-running monolithic femtosecond laser", Opt. Express 28, 25400 (2020).
Kalubovilage et al., "X-Band photonic microwaves with phase noise below −180 dBc/Hz using a free-running monolithic comb", Opt. Express 30, 11266 (2022).
Kenig et al., "Passive phase noise cancellation scheme," Phys. Rev. Lett. 108, 264102 (2012.
Kim et al., "Synchronization of nonsolitonic Kerr combs", Sci. Adv. 7, eabi4362 (2021).
Kinget, Integrated GHz voltage controlled oscillators, in Analog Circuit Design: (X)DSL and other Communication Systems; RF MOST Models; Integrated Filters and Oscillators, edited by W. Sansen, J. Huijsing, and R. van de Plassche (Springer US, Boston, MA, 1999) pp. 353-381.
Kondratiev et al., "Detailed analysis of ultimate soliton microcomb generation efficiency", arXiv:2209.03707 (2022).
Kwon et al., "Reference-free, high-resolution measurement method of timing jitter spectra of optical frequency combs", Sci. Rep. 7, 1 (2017).
Li et al., "Characterization of a high coherence, Brillouin microcavity laser on silicon," Opt. Express 20, 20170 (2012).
Li et al., "Electro-optical frequency division and stable microwave synthesis," Science 345, 309 (2014).
Li et al., "Microwave synthesizer using an on-chip Brillouin oscillator", Nat. Commun. 4, 2097 (2013).
Li et al., "Pump frequency noise coupling into a microcavity by thermo-optic locking," Opt. Express 22, 14559 (2014).
Li et al., "Small-sized, ultra-low phase noise photonic microwave oscillators at X-Ka bands", Optica 10, 33 (2023).
Liu et al., "Photonic microwave generation in the Xand K-band using integrated soliton microcombs", Nat. Photonics, 2020, vol. 14, pp. 486-491.
Ludlow et al., "Optical atomic clocks", Rev. Mod. Phys. 2015, vol. 87, 637, pp. 1-87.
Madjar et al., "Microwave generation by optical techniques—a review", Proceedings of the 36th European Microwave Conference, 2006, pp. 1099-1102.
Maleki, The optoelectronic oscillator, Nat. Photonics 5, 728 (2011).
Matsko et al., "Noise conversion in Kerr comb RF photonic oscillators," J. Opt. Soc. Am. B 32, 232 (2015).
Merklein et al., "Widely tunable, low phase noise microwave source based on a photonic chip", Opt. Lett. 41, 4633 (2016).
Raghunathan et al., "Athermal operation of Silicon waveguides: spectral, second order and footprint dependencies", Opt. Express 18, 17631 (2010).
Rappaport et al., "State of the art in 60-GHz integrated circuits and systems for wireless communications", Proc. IEEE 99, 1390 (2011).
Razavi, Design of millimeter-wave CMOS radios: A tutorial, IEEE Trans. Circuits Syst. 56, 4 (2009).
Rodrigues et al., "SiN-based waveguides with ultra-low thermo-optic effect, in Conference on Lasers and Electro-Optics", (Optica Publishing Group, 2022) p. SM4G.3.
Safavi-Naeini et al., "Laser noise in cavity-optomechanical cooling and thermometry", New J. Phys. 15, 035007 (2013).
Sayson et al., "Octave-spanning tunable parametric oscillation in crystalline Kerr microresonators," Nat. Photon. 13, 701 (2019).
Sayson et al., "Widely tunable optical parametric oscillation in a Kerr microresonators," Opt. Lett. 42, 5190 (2017).
Seeds et al., "Microwave photonics", J. Lightwave Technol., 2006, 24(12), 4628-4641.
Sun et al., "Squeezing the fundamental temperature fluctuations of a high-Q microresonator," Phys. Rev. A 95, 023822 (2017).
Tang et al., "Integrated optoelectronic oscillator", Opt. Express 26, 12257 (2018).
Tetsumoto et al., "Optically referenced 300 GHz millimetre-wave oscillator," Nat. Photon. (2021). https://doi.org/10.1038/s41566-021-00790-2.

(56) References Cited

OTHER PUBLICATIONS

Tian et al., "Optical frequency comb noise spectra analysis using an asymmetric fiber delay line interferometer", Opt. Express 28, 9232 (2020.
Timmer et al., "On generating power law noise", Astron. Astrophys. 300, 707 (1995).
Van Beek et al., "A review of MEMS oscillators for frequency reference and timing applications", J. Micromech. Microeng. 22, 013001 (2011).
Weng et al., "Coher-ent terahertz-to-microwave link using electro-optic-modulated turing rolls", Phys. Rev. A 104, 023511 (2021).
Weng et al., "Frequency division using a soliton-injected semiconductor gain-switched frequency comb", Sci-ence Advances 6, eaba2807 (2020).
Xie et al., "Photonic microwave signals with zeptosecond-level absolute timing noise", Nat. Photonics 11, 44 (2017).
Yamamoto et al., "Commutation relations and laser linewidth", Phys. Rev. A 41, 5164 (1990.
Yang et al., "Dispersive-wave induced noise limits in miniature soliton microwave sources", Nat. Commun. 12, 1442 (2021).
Yi et al., "Single-mode dispersive waves and soliton microcomb dynamics", Nat. Commun. 8, 10.1038/ncomms 14869 (2017).

\* cited by examiner

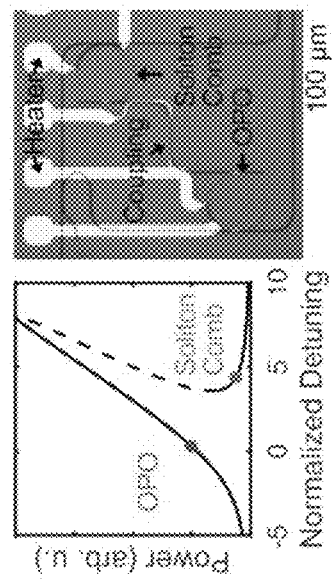
FIG. 13B
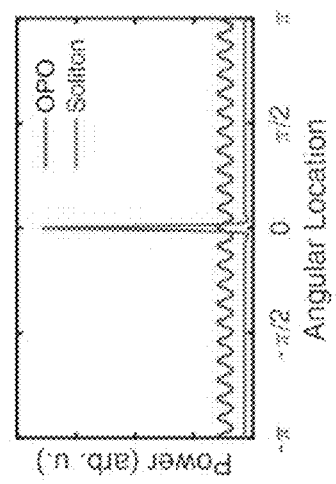
FIG. 13C
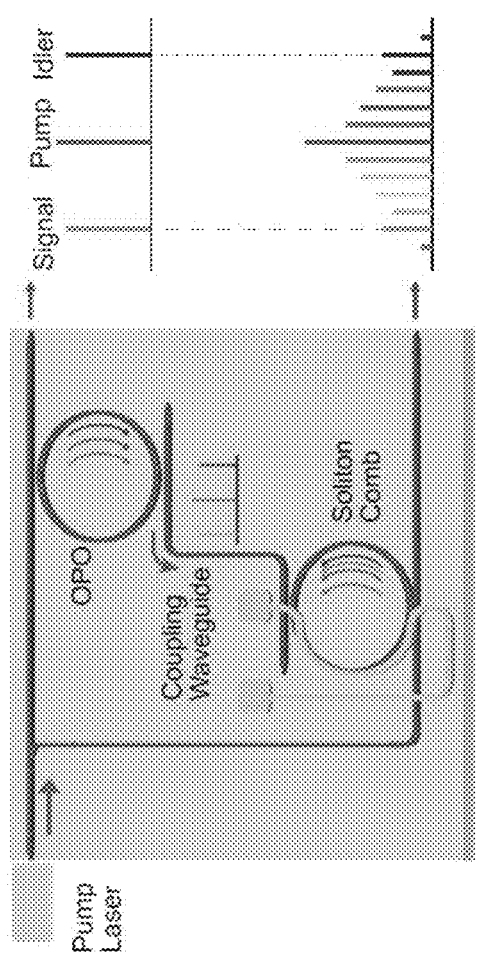
FIG. 13A
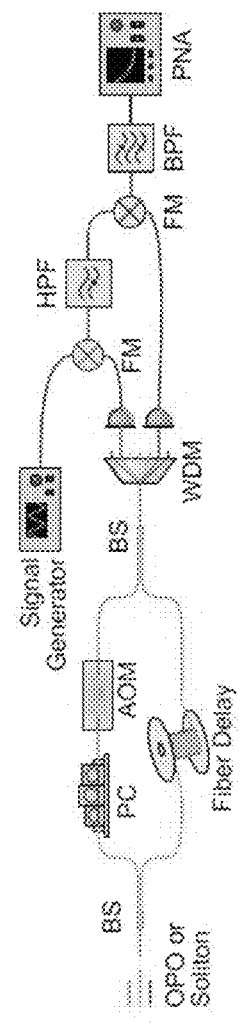
FIG. 13E
FIG. 13D

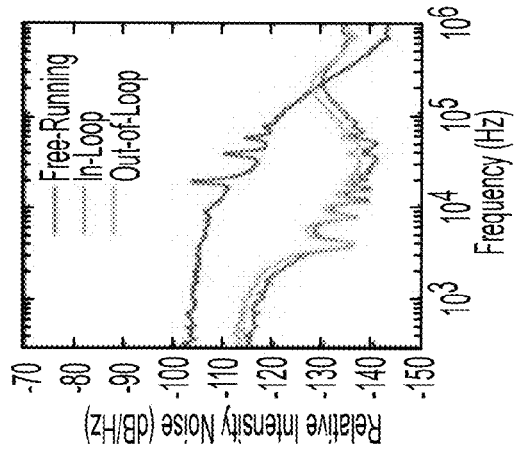
FIG. 15A
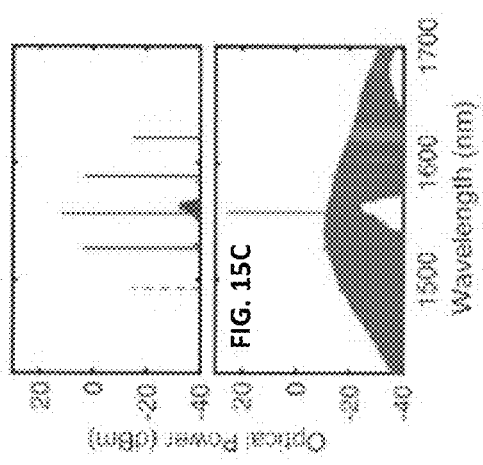
FIG. 15B
FIG. 15C
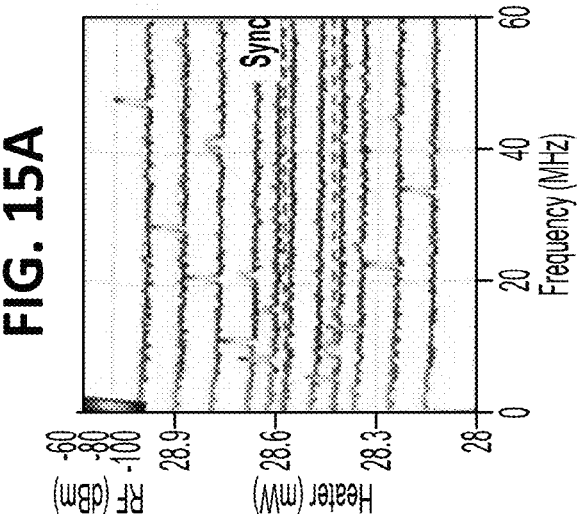
FIG. 15D
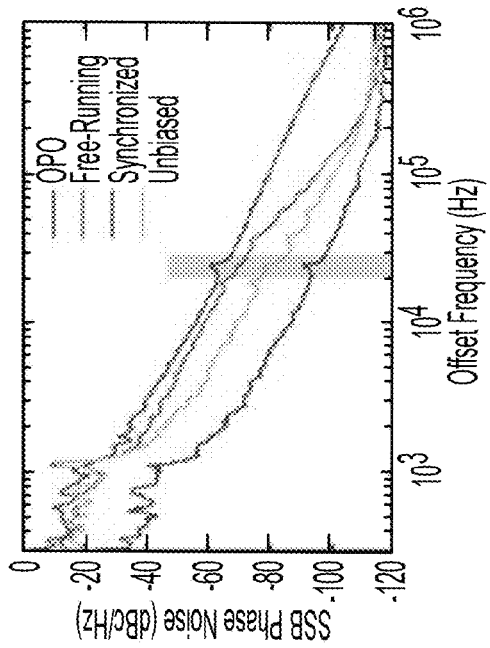
FIG. 15E
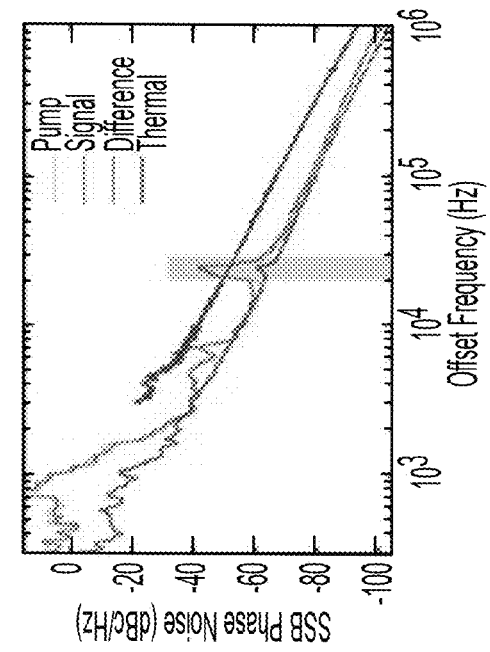
FIG. 15F

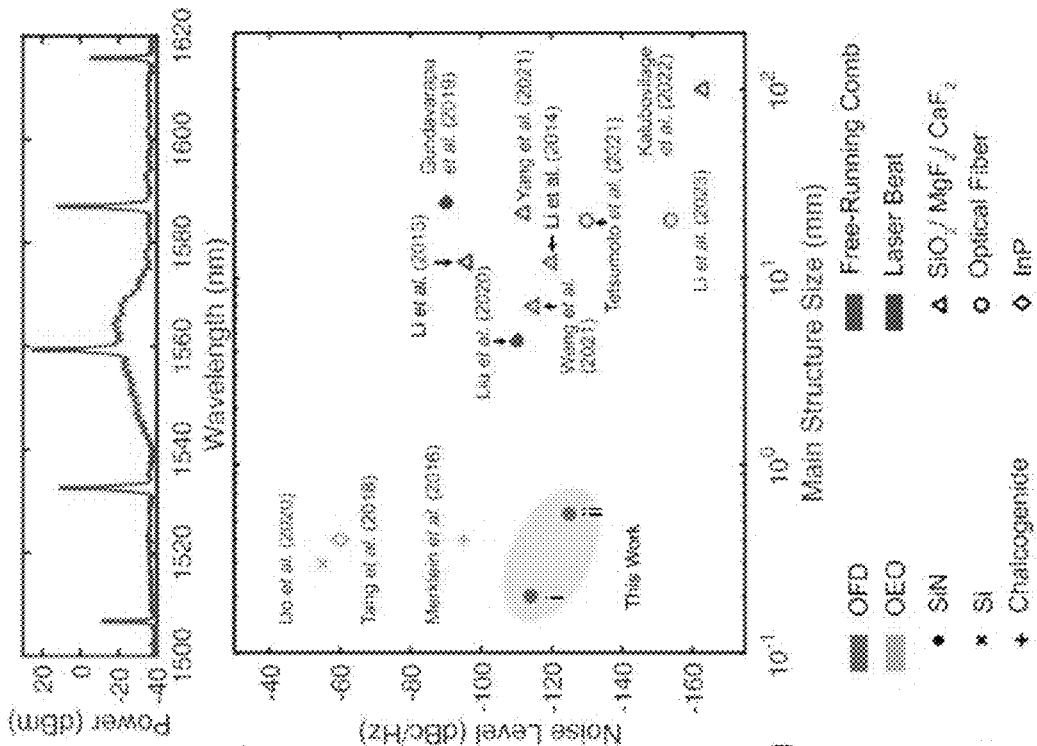
FIG. 16A
FIG. 16B
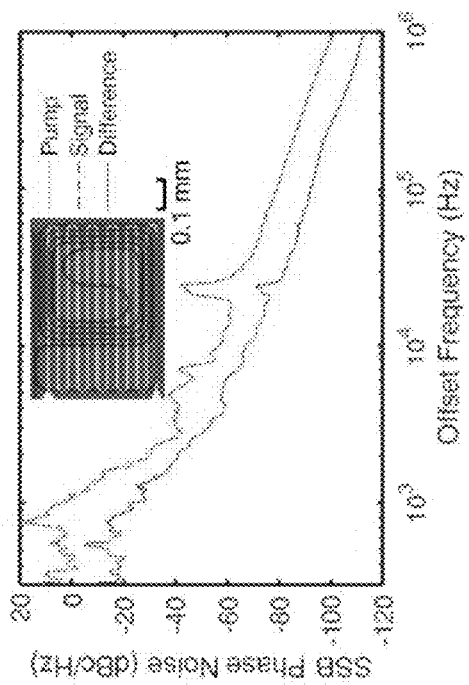
FIG. 16C
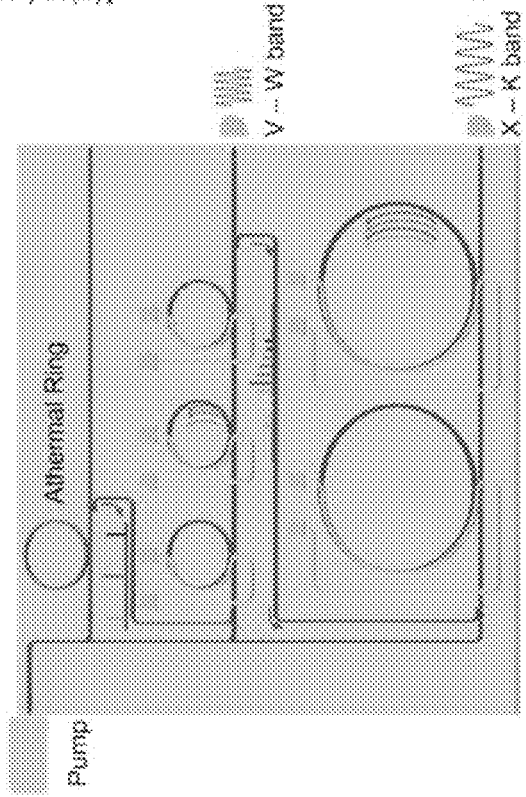
FIG. 16D

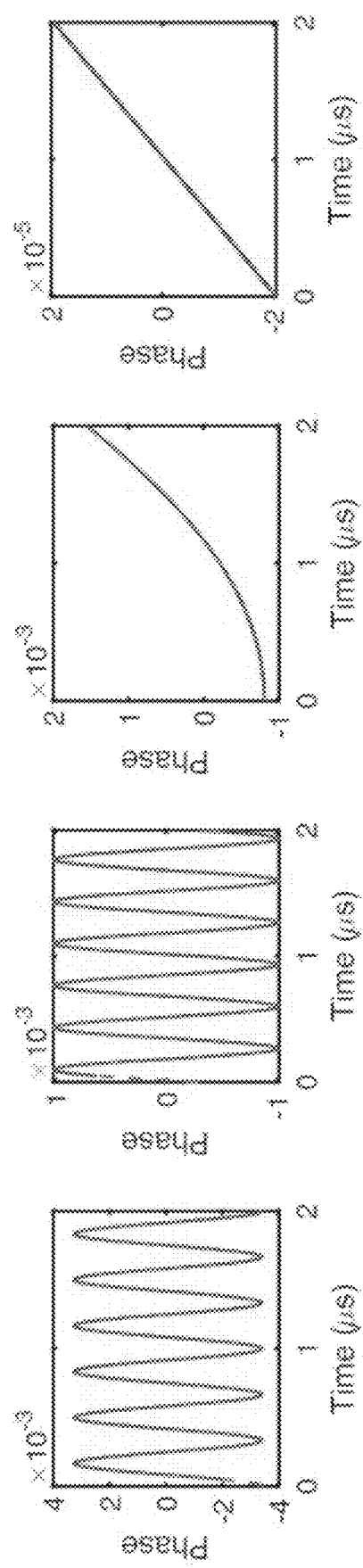

LOW FREQUENCY WAVE GENERATION VIA OPTICAL FREQUENCY DIVISION

CROSS-REFERENCE TO RELATED APPLICATIONS

The present application claims priority to and the benefit of U.S. patent application No. 63/337,237, "Low Frequency Wave Generation Via Optical Frequency Division" (filed May 2, 2022). All foregoing applications are incorporated herein by reference in their entireties for any and all purposes.

GOVERNMENT RIGHTS

This invention was made with government support under grant number FA9550-20-1-0297 awarded by the Air Force Office of Scientific Research (AFOSR), Grant No. HR0011-22-2-0007 awarded by the Defense Advanced Research Projects Agency of the U.S. Department of Defense, and Grant No. W911NF-21-1-0286 awarded by the Army Research Office (ARO). The government has certain rights in the invention.

TECHNICAL FIELD

The invention relates to optical apparatuses and more particularly to low frequency wave generation, and more particularly to wave generation via optical frequency division.

BACKGROUND

Ultra-low-noise microwave or radio frequency (RF) signals are paramount for a broad range of applications, including navigation, communication, radar, and metrology. Signals with very low noise increase the rate of data transmission and increase the performance of these signals. A microwave or radio frequency (RF) signal can be generated, e.g., by photo-mixing two highly coherent laser signals (See, e.g., Seeds A J, Williams K J. Microwave photonics. J. Lightwave Technol. 2006; 24(12): pp. 4628-4641). Waves with very low phase and amplitude fluctuations increase the rate of data transmission in wireless communication, enabling ultra-precise atomic and molecular spectroscopy, and more precise synchronization and time-measuring capabilities.

Current methodologies use two independent lasers with uncorrelated thermal and technical noises to generate optical frequencies, and can face challenges with the resulting noise, since the subsequent microwave oscillation has noise equal to the sum of those of the optical frequencies. Current technologies further rely on electronics (e.g., servo controllers) for error signal generation and feedback, as well as Brillouin lasers, which cannot achieve low-phase-noise and require large footprints. Thus, there is a need of a method to generate ultra-low-noise microwave signals in a comparatively small footprint.

SUMMARY

The present disclosure relates to low frequency wave generation, such as microwave and radiofrequency (RF) generation. In various embodiments, low frequency wave generation occurs via optical frequency division of an optical parametric oscillator-based frequency reference. This present invention relates to the generation of tunable ultra-low-noise microwave signals using continuous-wave lasers.

Optical synchronization used in this technology reduces the overall footprint and complexity of frequency division approaches. This technology provides a solution for generating a high-quality microwave signal within a compact footprint. It has numerous applications in the communication, navigation, and defense fields, as well as technology related to communications, radar systems, frequency metrology, fundamental science, sampling-based systems, analog to digital converters, and atomic clocks, among other things.

In certain aspects, embodiments to generate tunable low frequency signals, such as microwave and radiofrequency signal, comprise a plurality of waveguides, each comprising at least one ring resonator, and at least one controllable heating element associated with each ring resonator. In embodiments, a first waveguide in optical communication with a first ring resonator can be configured to receive a light input and generate frequencies via optical parametric oscillation; a second waveguide with second ring resonator can receive the frequencies and optically synchronize the frequencies via optical frequency division to generate a low frequency signal; and one or more heating elements can be connected to each ring resonator to tune the resonators and reduce noise associated with the low frequency signal.

The scope of the invention also includes a system including a processor that executes stored instructions for executing the steps of the method. The above and other characteristic features of the invention will be apparent from the following detailed description of the invention.

BRIEF DESCRIPTION OF THE DRAWINGS

The file of this patent or application contains at least one drawing/photograph executed in color. Copies of this patent or patent application publication with color drawing(s)/photograph(s) will be provided by the Office upon request and payment of the necessary fee.

The present application is further understood when read in conjunction with the appended drawings. The file of this patent or application contains at least one drawing/photograph executed in color. Copies of this patent or patent application publication with color drawing(s)/photograph(s) will be provided by the Office upon request and payment of the necessary fee. In the drawings:

FIGS. 13A-13E illustrate a schematic of on-chip low-noise microwave generation via frequency division and related performance. FIG. 13A illustrates a high-level schematic of a photonic integrated chip for all-optical OFD. The top microresonator operates in the OPO regime, resulting in the frequency-correlated signal-idler pair, which serves as a stable optical reference. The microresonator at the bottom operates in the Kerr-soliton regime, which has a repetition rate in the microwave domain. An evanescently coupled waveguide transfers the stability of the OPO reference to the comb via all-optical synchronization. The resonances of the microresonators are independently controlled through suitable application and modulation of electric currents on the integrated heaters (yellow trace). FIG. 13B illustrates different dynamical branches of a Kerr cavity. The left (right) solid trace corresponds to the blue-detuned (red-detuned) branch, which supports the OPO (soliton) state. The dashed trace corresponds to a dynamically unstable branch. FIG. 13C illustrates the photonic chip used in the experiment. FIG. 13D illustrates a schematic of a delayed self-heterodyne setup for phase-noise characterization. BS is beam splitter, PC is polarization controller, AOM is acousto-optic modulator, WDM is wavelength-division multiplexer, FM is frequency mixer, HP is high pass filter, BP is bandpass filter, and PNA is phase noise analyzer. This system can measure the phase noise carried by the difference frequency of the blue and red components. FIG. 13E illustrates the waveforms of OPO and soliton inside the cavity. The OPO has shallow and dense oscillations, while the soliton has a sharp peak and a low CW background. In the experiment, 0.002‰ of the OPO power is coupled to the soliton comb.

FIG. 14A illustrates a numerical simulation of an OPO generated in a 200-GHz-FSR microresonator with a loaded Q of $10^6$. The pump and thermal noise are input parameters given by the red and blue traces, which correspond to experimental measurements. The signal and idler phase noise are calculated via numerical simulation (yellow and purple). The green trace corresponds to the noise of the difference phase between the signal and idler modes, which shows strong suppression of the pump and thermal noise. The dashed line corresponds to the dual-point STL given by Eq. (S24). FIG. 14B illustrates the optical power spectrum of STL-limited fields. The blue trace corresponds to the STL trace in FIG. 14A, whereas the red trace corresponds to the case of a 50-GHz-FSR microresonator with a Q of $4\times10^6$, which yields a sub-hertz dual-point STL. FIG. 14C illustrates the maximum phase-noise reduction as a function of frequency for all-optical synchronization. The microresonator parameters are identical to those in FIG. 14A. FIGS. 14D and 14E illustrates a temporal evolution of the OPO (FIG. 14D) and soliton comb (FIG. 14E) under all-optical synchronization. The drift of the soliton timing is captured by the OPO trajectory after the optical coupling is turned on, with a coupling coefficient of $2.25\times 10^{-6}$ per roundtrip time.

FIGS. 15A-15F provide an experimental demonstration of OPO-soliton synchronization. FIG. 15A illustrates an OPO-soliton beat note as the soliton heater is tuned. The synchronization regime is marked in dashed lines. FIGS. 15B and 15C illustrate an optical spectra of the (FIG. 15C) OPO and (FIG. 15D) soliton comb, respectively. The bump around 1700 nm in FIG. 15C is an artifact from the spectrum analyzer. FIG. 15D illustrates the relative intensity noise of the pump laser before and after feedback control. FIG. 15E illustrates noise characterization of the various components of the OPO, including the pump, signal, signal-idler difference frequency (7.7 THz), and the TRN noise. The strong noise peaks in the pump laser are suppressed in the relative-phase noise. FIG. 15F illustrates a comparison of the phase noise in the soliton repetition rate (227 GHz) when the soliton is free-running and synchronized to the OPO. For reference, the relative phase noise of the OPO is shown. The noise of a free-running soliton without temperature bias is shown in yellow, which has lower noise than the heated soliton but higher than the synchronized soliton.

FIG. 16 illustrates improved OPO performance and proposed full system for tunable microwave generation. FIGS. 16A and 16B illustrate the optical spectrum (FIG. 16A) and phase noise (FIG. 16B) of the OPO generated in a 20-GHz-FSR microresonator. A noise level of −68 dBc/Hz at 10-kHz offset was measured with a carrier frequency of 6.7 THz. The inset of FIG. 16A shows the microscope image of the OPO cavity. FIG. 16C illustrates a proposed on-chip ultra-low-phase-noise widely-tunable microwave source. The optical reference is a broad-band OPO generated in the athermal ring. Multiple soliton rings are fabricated to allow Kerr-comb generation with mode spacings in the microwave X to W band. On-chip heaters are used to activate the desired ring with optical detuning. The microwave signal is generated via photodetection of the Kerr-comb signals. FIG. 16D illustrates a comparison of the recent progresses of microwave generation using optical devices, plotted as phase noise at an equivalent 10-GHz carrier frequency and 10-kHz offset frequency against the size of the main structure. The current work for (i) synchronized 227-GHz soliton and (ii) 6.7-THz OPO is highlighted in the blue-shaded region.

FIG. 17 illustrates the theory of Schawlow-Townes linewidth of $\chi(3)$ OPO.

FIG. 18 illustrates a characterization of noise suppression via synchronization. In FIGS. 18A-18D, the repetition-rate change induced by a sinusoidal modulation of τd at a frequency of 300 kHz (FIG. 18A, FIG. 18B) and 3 kHz (FIG. 18C, FIG. 18D) without the coupling link (FIG. 18A, FIG. 18C) and with the coupling link (FIG. 18B, FIG. 18D). The solid traces are numerical simulations with Eqs. (S33) and (S34), and the dashed traces are fits.

FIG. 19 illustrates thermal noise characterization.

DETAILED DESCRIPTION OF ILLUSTRATIVE EMBODIMENTS

The present disclosure can be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention.

Figure 1:
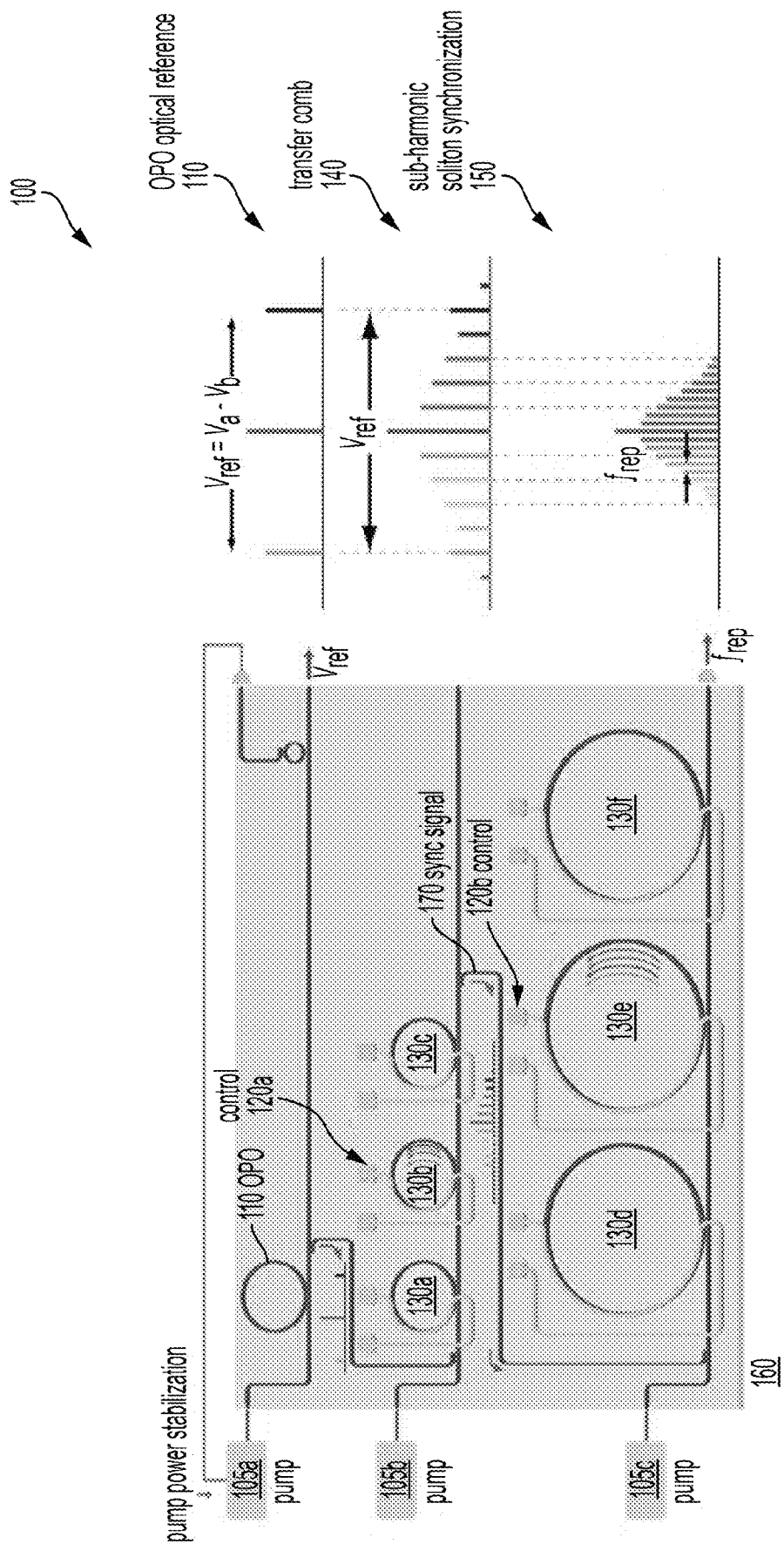
FIG. 1 illustrates a schematic representation of an approach for microwave generation in accordance with aspects of the present disclosure.
Figure 2:
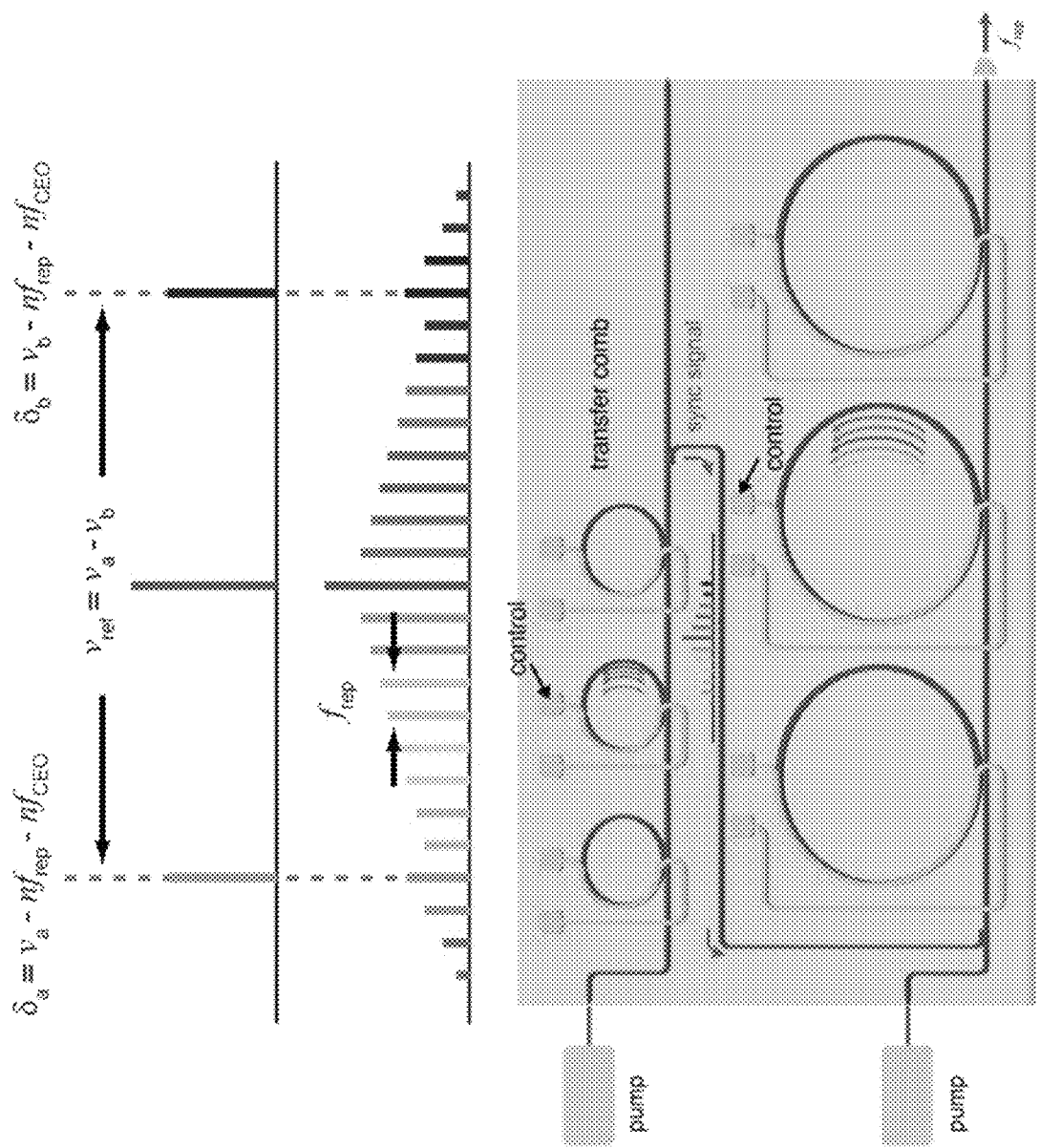
FIG. 2 illustrates another schematic representation for microwave generation in accordance with aspects of the present disclosure.

FIGS. 1 and 2 illustrate schematic representations of an approach for microwave generation. The device enables the generation of tunable ultra-low-noise radio-frequency (RF)/microwave signals using continuous-wave lasers. Microwave generation requires two stages that are realized in small-footprint photonic chips. First, two optical frequencies carrying strong phase correlations are generated via optical parametric oscillation (OPO). Second, the correlated optical frequencies are converted to low-noise RF/microwave signals via optical frequency division (OFD). In traditional frequency division, the optical frequencies are generated using two independent lasers with uncorrelated thermal and technical noises. The subsequent RF/microwave oscillation has noise equal to the sum of those of the optical frequencies.

As illustrated in FIG. 1, the device 100 can receive light input from one or more pumps 105a, 105b, 105c, and comprise an OPO section 110, a plurality of resonators (130a-f), and one or more controls 120 for each resonator 130. The control elements 120a, 120b, can control heating elements, which allow thermal tuning of each resonator. The device 100 can comprise one or more waveguides in optical communication with the resonators, and configured to generate a plurality of frequencies, as discussed herein. FIG. 1 shows that the OPO section 110 can provide an optical reference, corresponding to $v_{ref}=v_a-v_b$. The transfer comb 140 corresponds to $v_{ref}$ and is associated with one or more resonators, e.g., resonators 130a, 130b, 130c, managed by control elements 120. The optical reference signal can then be synchronized 170 and provided to resonators 130d, 130e, 130f, where the optical output corresponds to sub-harmonic soliton synchronization 150, with the characteristic frequency $f_{rep}$.

In various embodiments, widely separated optical reference sidebands can correspond to $v_{ref}$=50 THz via $\chi^{(3)}$ OPO, as discussed below. Moreover, OFD can use dissipative Kerr soliton frequency comb, with spacing $f_{rep}$, and a phase noise reduction can correspond to $v_{ref}/f_{rep}$. In embodiments, the various components can reside on a chip 160.

FIG. 2 illustrates a similar device, providing an all-optical locking via synchronization. Similar to FIG. 1, the device can comprise one or more pumps, each connected to a plurality of resonators. The transfer comb, resonator, and control unit/heating element structure can provide an optical reference signal corresponding to $v_{ref}=v_a-v_b$, and locking between $\delta_a$ and $\delta_b$.

In the present embodiments, the OPO provides unique noise-suppression mechanisms. First, the optical frequencies (signal and idler) inherit identical frequency fluctuations from the pump laser. Since OFD divides the frequency difference of the signal and idler, the pump fluctuations are cancelled in the RF/microwave signal. Second, thermorefractive noise shifts the resonance frequencies toward the same direction in frequency. Since energy conservation forbid the signal and idler frequencies to shift to the same direction, thermorefractive noise is strongly suppressed in OPO generation. Third, by tuning the pump laser to the high frequency side of the resonator mode, a kilohertz-level-linewidth laser can suppress the naturally occurring thermal fluctuations of the microresonator through thermorefractive backaction. Finally, the OPO can be realized in most optical materials since of the required third-order nonlinearity is universally present. Further noise reduction can be realized by performing OPO in materials or photonic systems with lower thermorefractive coefficients.

In accordance with embodiments discussed herein, the OPO is generated in a microresonator pumped by a continuous-wave laser. A soliton mode-locked Kerr comb with a suitable mode spacing is generated in another microresonator with a pump derived from the same continuous-wave laser. The two processes differ in requirements for laser power, detuning, and resonator free-spectral range.

In addition, to reference the Kerr comb to the OPO signal and idler, it is important to ensure that a pair of soliton comb lines align with the OPO frequencies. These requirements can simultaneously be satisfied with carefully optimized fabrication processes and post-fabrication thermal tuning. The aligned lines are then frequency-locked. This locking can be achieved via passive all-optical synchronization of the Kerr comb to the OPO, which considerably alleviates dependence on electronics and active components. Furthermore, this synchronization scheme can be achieved in a cascaded chain, where a Kerr comb of a moderately large mode spacing is first synchronized to the OPO and another Kerr comb with a smaller spacing is synchronized to that comb via sub-harmonic synchronization. While this scheme increases system complexity and power requirements, it allows mitigation of potential issues associated with soliton comb efficiency which scales unfavorably with decreasing mode spacing. The desired RF/microwave oscillation is extracted from the mode spacing of the final soliton comb by optical detection. The phase noise reduction given by frequency division of the OPO is $20 \times \log(\Delta\Omega/\Delta\omega)$ where $\Delta\Omega$ is the OPO signal/idler frequency difference and $\Delta\omega$ is the soliton comb mode spacing.

The frequencies of the signal and idler, and the bandwidth of the Kerr comb can be controlled by varying the waveguide cross section. The frequency of the RF oscillation is controlled by the circumference of the Kerr comb resonator. These factors are used to adjust the frequency-division factor which corresponds to additional noise suppression. To suppress the generation of spurious frequency components in the OPO, induced mode interactions can be used to eliminate the phase matching condition enabling these processes. Mode interactions can be created through coupling to different polarization modes, high-order modes, or more targeted through the modes of an auxiliary ring. Using an auxiliary ring with resonance tuning provides the necessary control to target the undesired frequencies and suppress them. Alternatively, the locking can be performed electronically by feeding error signals to the power and frequency of the Kerr-comb pump.

Such optical synchronization can reduce the overall footprint and complexity of frequency division approaches used currently which involves electronics for servo controllers for error signal generation and feedback for electronic stabilization. Embodiments of the present invention provide a solution for generating a high-quality microwave signal within a compact footprint.

Embodiments allow for realization of low phase noise microwave generation while maintaining a compact footprint. An all-optical synchronization of a soliton Kerr comb to an OPO transfers the high phase stability of the OPO-based optical reference to the soliton without the need for electronic feedback reducing the overall size, weight and power (SWAP) requirements.

Figure 3:
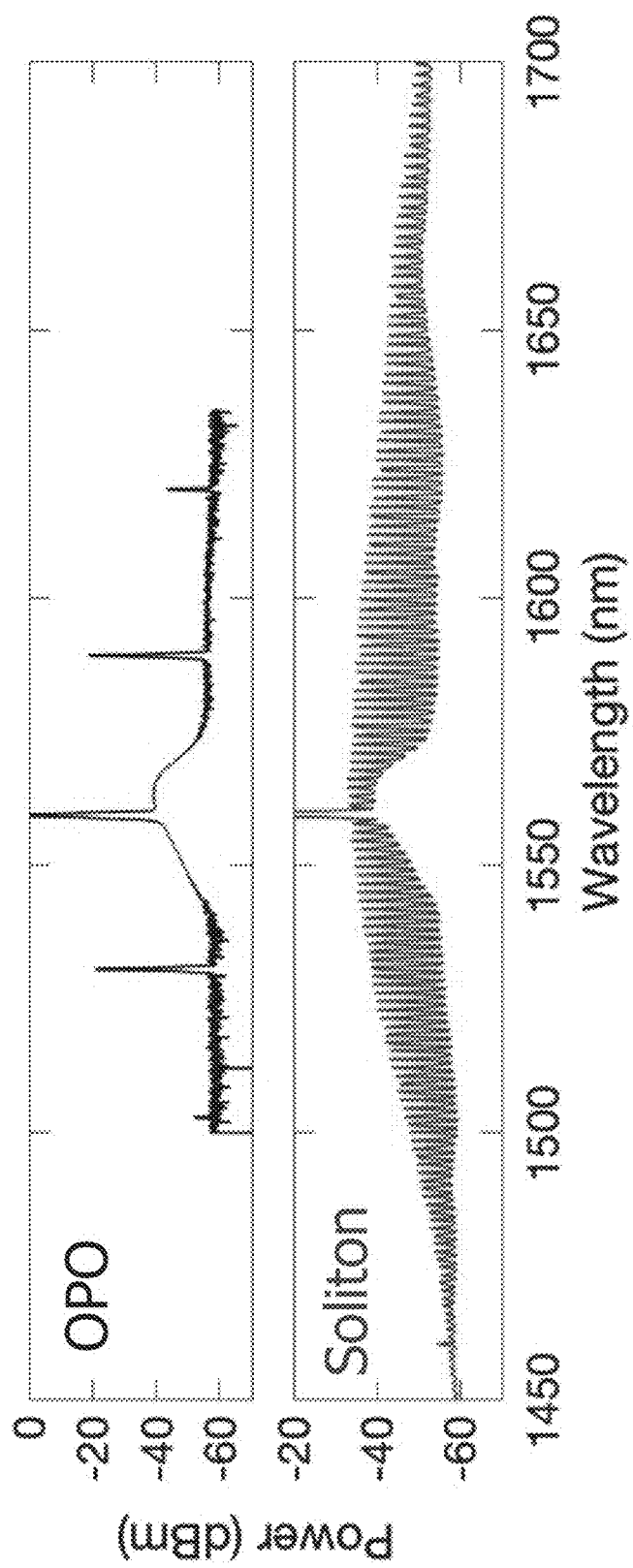
FIG. 3 illustrates a comparison of OPO power and soliton power.

As illustrated in FIG. 3, which illustrates a comparison of OPO power and soliton power, the OPO power output is tuned between an approximately 130-150 nm wavelength band, and has significantly reduced noised, compared to the soliton. The OPO graph illustrates prominent peaks around 1530 nm at ~−20 dBm, 1560 nm at ~0 dBm, 1595 nm at ~−20 dBm, and a smaller peak around 1620 nm at ~−45 dBm. The soliton graph illustrates a prominent peak around 1560 nm around −20 dBm, and significantly greater noise.

Figure 4:
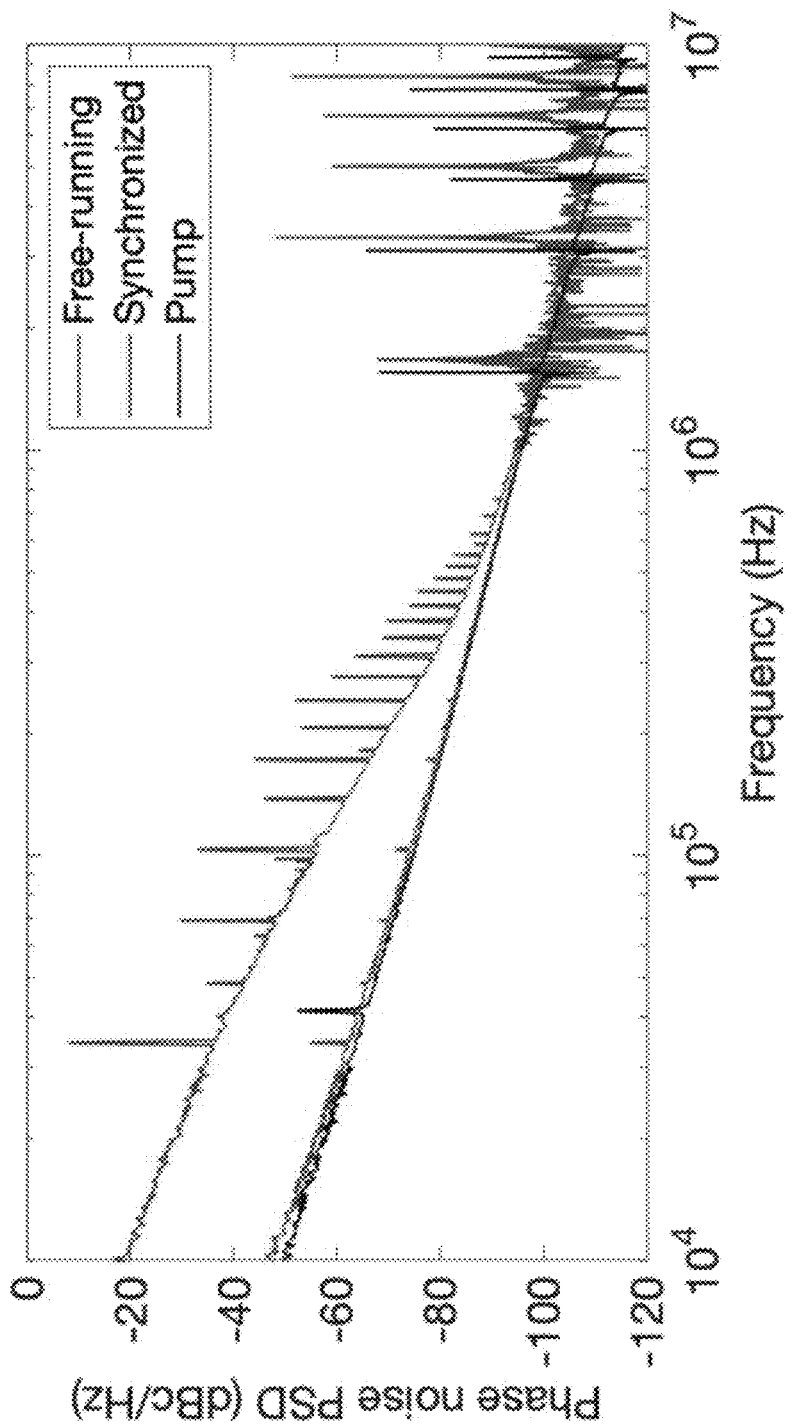
FIG. 4 illustrates a graph of phase noise power spectral density (PSD) for free-running, synchronized, and pump examples, in accordance with aspects of the present disclosure.

FIG. 4 illustrates a graph of phase noise power spectral density (PSD) for free-running, synchronized, and pump examples, in accordance with aspects of the present disclosure. FIG. 4 illustrates reduction of phase noise of the twelfth comb line by ~30 dB at 10 kHz. The results coincide with pump phase noise when synchronized, and thermorefractive noise in Kerr microresonators are nearly suppressed.

The free-running example illustrates a greater phase noise PSD from $10^4$ to about $10^6$ Hz than the synchronized and pump examples. After about $10^6$ Hz, the free-running, synchronized, and pump examples significantly overlap, and decrease below approximated −80 dBc/Hz. Each example contains peaks above −80 dBc/Hz between $10^6$ to $10^7$.

Figure 5:
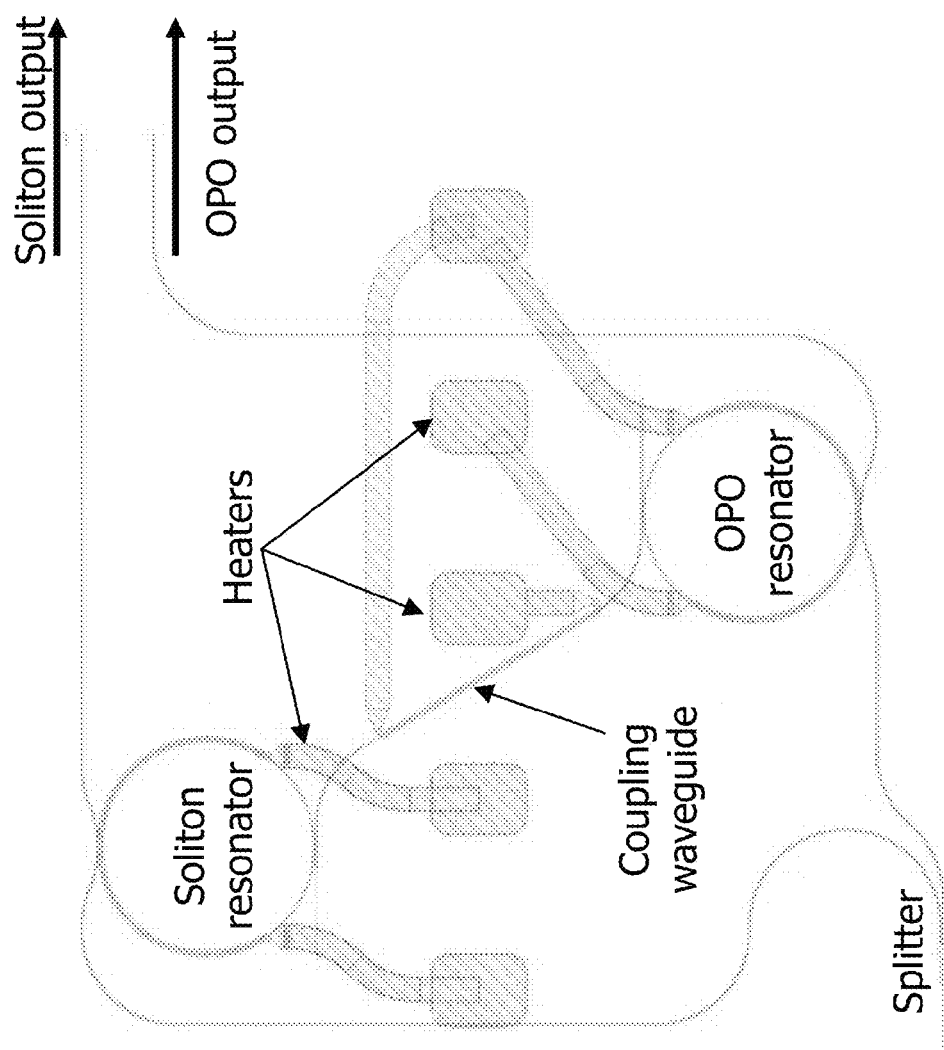
FIG. 5 illustrates a schematic of a coupled soliton resonator and OPO resonator in accordance with aspects of the present disclosure.

FIG. 5 illustrates another schematic of a coupled soliton resonator and OPO resonator in accordance with aspects of the present disclosure. In embodiments, a splitter can be implemented prior to the soliton resonator and OPO resonator. At least one heater can further be provided on each resonator, configured to thermally tune the optical signals in accordance with the examples and embodiments discussed herein. A coupling waveguide can be provided between the soliton resonator and the OPO resonator, and each resonator can be configured to provide a separate, respective output, i.e., a soliton output from the soliton resonator, and an OPO output from the OPO resonator.

The present technology can utilize a Brillouin laser as the reference, which fundamentally cannot achieve low phase noise as compared to an OPO. In addition, the optical synchronization technique does not require or use any active electronics for feedback and stabilization as compared to traditional technologies.

Accordingly, the present invention is applicable to a wide range of applications, due to its ability to provide compact, stable microwaves and low frequency waves. Such frequencies are critical components for various applications, including but not limited to communications, radar, metrology, sampling-based measurement systems and analog to digital converters.

Photonic Sources for Microwaves

In various embodiments, a $\chi^{(3)}$ OPO can be based on four-wave mixing (FWM) in a SiN microresonator to generate two optical signals separated by 50 THz. This reference can then be frequency divided by the frequency comb discussed herein, to produce an ultralow-noise microwave signal. Due to the noise correlations and initiation of the FWM process via vacuum fluctuations, these approaches offer superior noise properties as compared to signals generated from other integrated lasers (e.g., semiconductor, SBS). For the FWM process, a phase-matching via 4th-orderchromatic dispersion can be utilized and have enabled signals/idlers to be tuned over wide separations as large as 346 THz. Embodiments have also shown that it is possible to achieve conversion efficiencies on the order of 10% with this scheme.

In various systems and embodiments, a pump source centered at 1550 nm can generate a broadband spanning signal and idler sidebands at 1372.6 nm and 1780 nm. This allows for a 50-THz optically carried reference.

Figures 6A, 6B:
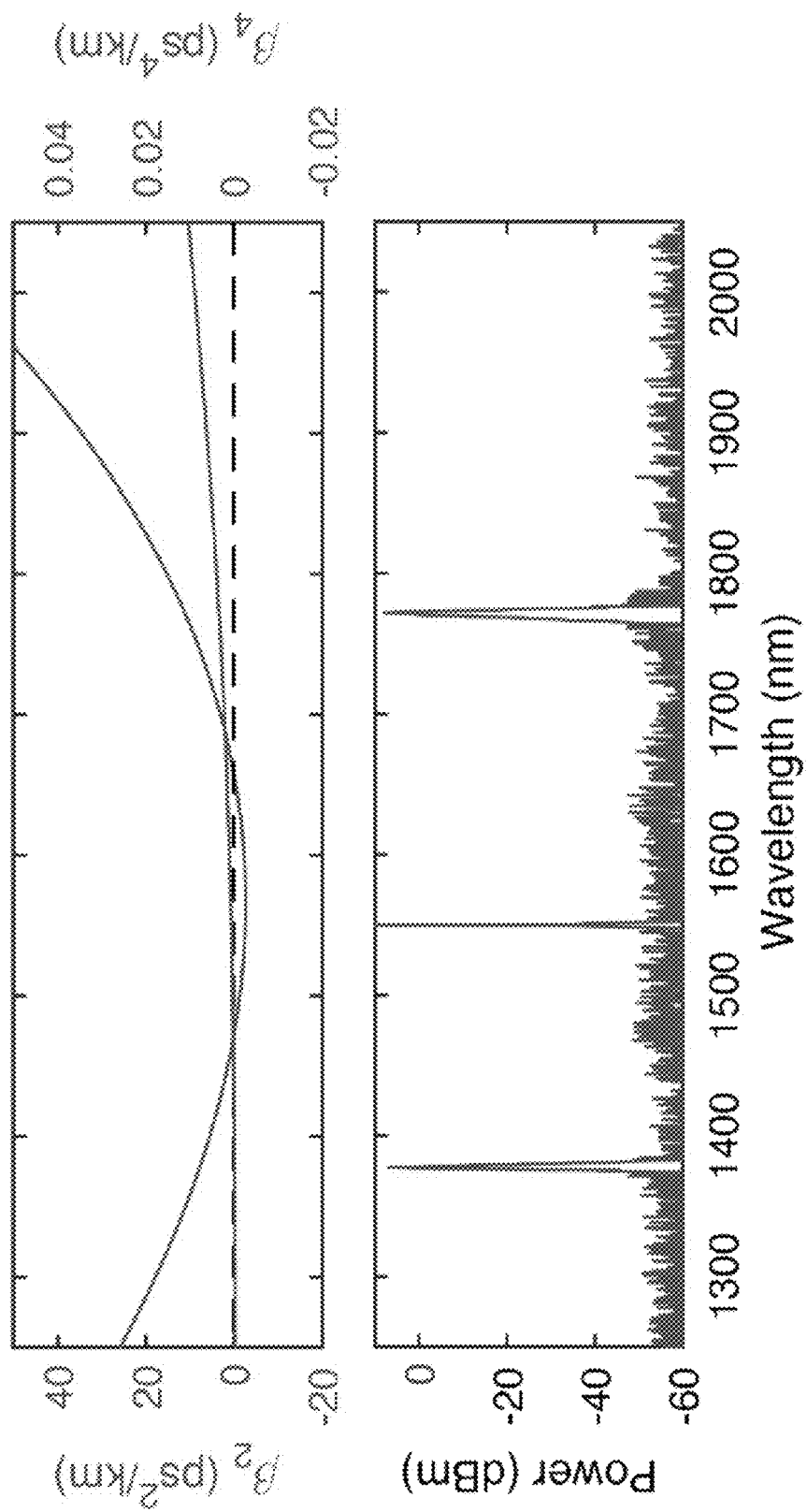
FIG. 6A (top) illustrates group-velocity dispersion $\beta_2$ and fourth-order dispersion $\beta_4$ of 730×2660-nm cross section SiN resonator.
FIG. 6B (bottom) illustrates a simulated OPO output spectrum for 50-GHz FSR SiN microresonator. Here the first sideband is separated by 48.4 THz and both signal/idler have power >7 dBm.

FIG. 6 shows a simulated output OPO spectrum for a 50-GHz FSR SiN microresonator with an intrinsic Q-factor of 2 million and a cross section of 730×2660 nm which offers suitable dispersion for the OPO system. The OPO dynamics can be modeled using the Lugiato-Lefever equation and the generated signal/idler pair can be generated at 1378 nm and 1772 nm with powers >5 mW. This signal-idler separation corresponds to 48.4 THz. The position of the sidebands can be further optimized by engineering the GVD and fourth-order dispersion of the microresonator.

Theoretical analyses of the phase-noise properties of the OPO reveal key features for minimizing noise, including pump-noise and thermal-noise suppression. In the paragraphs below, the contributions of each noise sources are separately discussed. For example, in embodiments, the total phase-noise spectrum can be the sum of all of individual noise sources contributions since they are uncorrelated. With careful design, the OPO phase noise can be reduced to the STL level.

Schawlow-Townes Limit:

In embodiments, the STL for the OPO can be due to spontaneous parametric generation and corresponds to the fundamental limit of phase noise. For a triply resonant OPO, the STL linewidth of signal and idler can be expressed as, $$\Delta f_{s,i} = \frac{\gamma_s^2 \gamma_i^2 h \nu_{s,i}}{2(\gamma_s + \gamma_i)^2 P_{s,i}},$$

Where $\gamma^2_{s,i}$, $\nu_{s,i}$, $P_{s,i}$ are the cavity linewidths, frequencies, and output powers, respectively, of the signal and idler fields. For an OPO with 200-MHz cavity linewidth and 5 mW output power, the STL corresponds to a phase-noise of −94 dBc/Hz @ 10 kHz for the signal-idler beat note frequency. Combining this phase noise with the potential 74-dB noise reduction from OFD would allow reaching a noise level of −169 dBc/Hz, which is beyond the Phase 2 metric. Importantly, at room temperature, the STL linewidth of such an OPO is ~500 narrower than that of an SBS laser owing to the extremely low thermal occupancy at the idler frequency compared to the phonon frequency [4] and constitutes a significant advantage of the OPO-based scheme compared to the previously demonstrated SBS-laser based schemes [5]. Moreover, pump-noise suppression, which is a primary feature of narrow-linewidth SBS lasers, can also be achieved in OPO systems, and has been largely overlooked in conventional OPO design.

Figure 7:
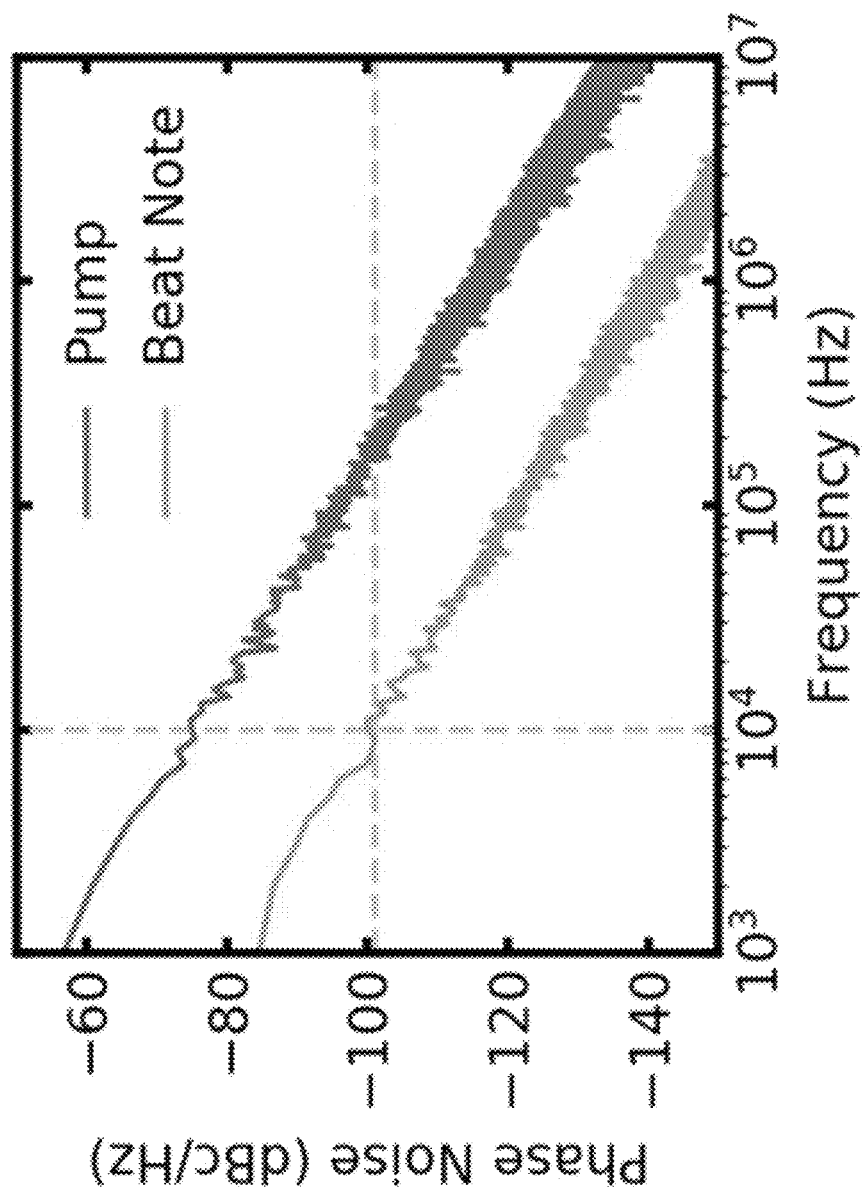
FIG. 7 illustrates a simulated signal-idler beat-note noise of an OPO with a slightly different loss rate for the signal and idler. Only pump noise is considered, which is strongly suppressed by more than 20 dB.
Figure 8:
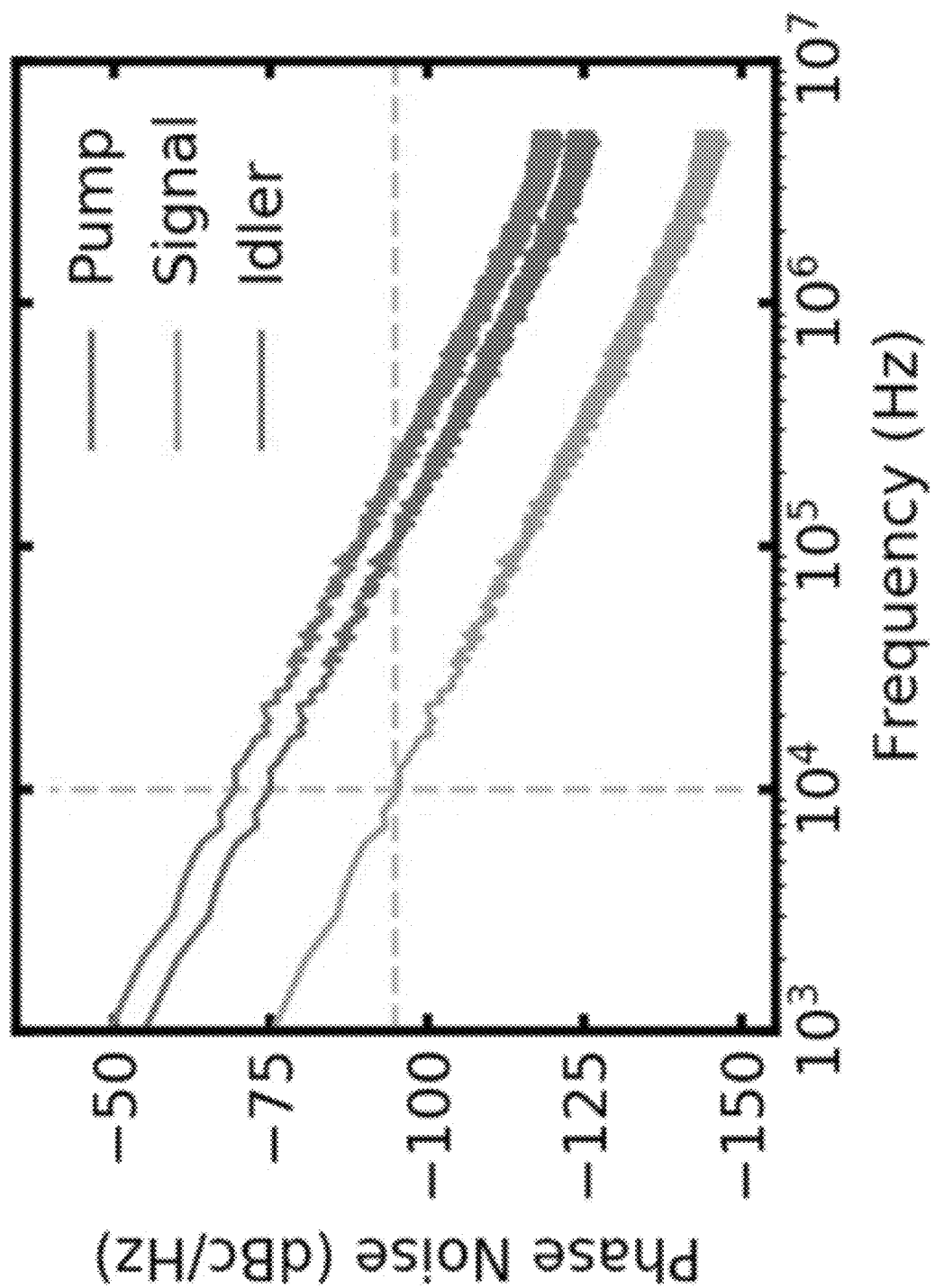
FIG. 8 illustrates a simulated phase noise of an OPO with high idler loss rate, which leads to strong suppression of the signal noise. Only pump noise is included in the simulation.

Pump Noise:

One unique feature of OPO systems is that the pump phase noise can be controllably distributed between signal and idler by designing the cavity. For signal and idler with equal loss rates, the pump phase fluctuations are decoupled from the differential phase of the pair, leading to a beat frequency that is free from pump noise. Similar concepts have been proposed to construct high-Q microelectromechanical (MEMS) oscillators [6]. This pump-noise suppression is robust even when the loss rate of the signal and idler are not perfectly matched (see FIG. 7). To study the effect of pump phase noise on the signal and idler, other noise sources, including vacuum and thermal fluctuations, can be set to zero. The OPO can be simulated using a 10-Hz-linewidth pump laser and assume a 20% mismatch in loss rates for the signal and idler modes. The phase noises are found to be −101 dBc/Hz at 10-kHz offset frequency, which is far below the STL. Alternatively, most of the pump noise can be distributed into the idler by increasing its loss rate to be much larger than that of the signal, leading to low-noise signal generation as might be expected from a quantum-limited amplifier. For example, the signal noise is found to be 20-dB lower than the pump if the idler loss rate is 20× that of the signal (FIG. 8). For a 10-Hz-linewidth pump, this corresponds to a phase noise of −95 dBc/Hz at 10-kHz offset, which is also below the STL.

While this approach of introducing large loss at the idler increases the OPO threshold and has a slightly worse noise performance, it greatly reduces the requirement of fabrication accuracy and allows a more flexible choice of reference frequencies for OFD. As a result, this approach can be used for risk mitigation.

The effect of the pump relative intensity noise (RIN) on the OPO operation was also analyzed. Since the pump, signal and idler are the only oscillating components, the numerical study can be simplified by using a 3-modes coupled equations [7], which have been verified to provide an accurate description of the cavity dynamics in the OPO regime. While the exact properties of the pump intensity noise depend on details of the underlying laser processes, a white-noise process is assumed, with a modest power spectral density of −150 dBc/Hz [8]. The resonance linewidths are also assumed to be identical (200 MHz) for all the 3 modes.

Figures 9A, 9B:
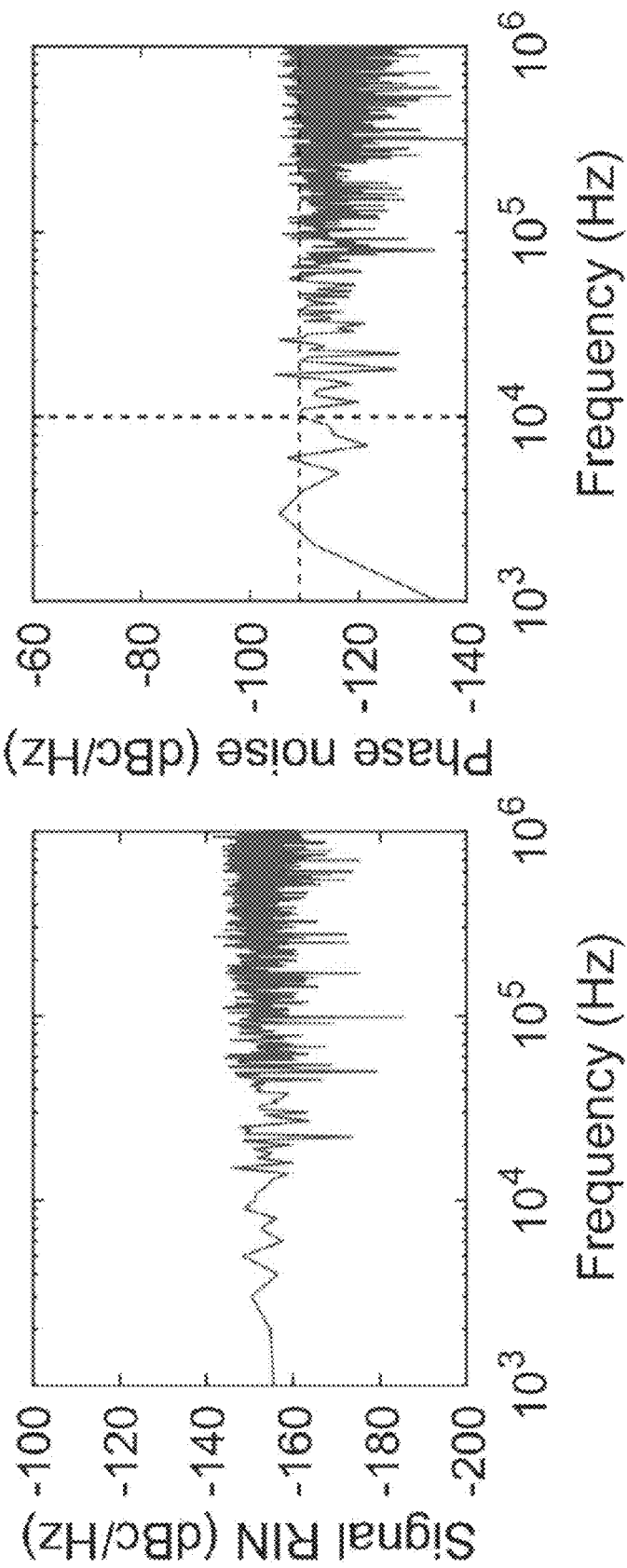
FIG. 9A illustrates a simulated relative intensity noise of a signal according to the present disclosure.
FIG. 9B provides a simulated phase noise of a signal-idler beat note. The phase noise is −110 dBc/Hz at 10-kHz offset frequency.

FIG. 9A (top) shows the simulated RIN spectral density of the signal. By integrating the spectral density, a root-mean-square relative intensity fluctuation of 0.06% can be calculated. Furthermore, a numerical confirmation shows that the pump RIN does not couple to the relative phase of the signal and idler, when all the resonance widths are assumed to be equal. This result is consistent with the analysis above. There are several factors, such as frequency-dependent scattering and bus-to-ring coupling that could lead to frequency-dependent resonance linewidths. Such frequency dependence must be considered for the OPO, where the signal and idler are spectrally far apart.

In addition, the above accounted for frequency-dependent Rayleigh scattering rate by the usual $f^4$ relation [7], and the frequency-dependent bus-to-ring coupling rate is estimated from a finite-element simulation [9].

FIG. 9B (bottom) shows the worst-case simulated phase noise of the beat note when the frequency dependent resonance linewidth is taken into account. While it is clear that the pump RIN couples to the relative phase noise under such realistic conditions, the phase noise contribution is computed to be −110 dBc/Hz at 10-kHz offset frequency (i.e., black dashed lines).

Thermorefractive Noise.

Although the above embodiments can develop the use of an athermal microresonator for reducing TRN, other approaches for TRN suppression in the OPO system have been explored to further reduce its effects, and for risk mitigation. Accordingly, there exist two mechanisms that can lead to TRN reduction in OPOs. The first is common-mode noise rejection, which relies on the fact that, due to energy conservation, signal and idler frequencies cannot both increase or decrease, and thermal fluctuations shift the cavity resonances in the same direction. Thus, if the thermal-induced detuning for the pump, signal, and idler resonances are identical, TRN-induced phase noise can be fully eliminated. However, the amount of thermal-induced detuning is proportional to frequency. Thus, the common mode-rejection effect is weaker for large frequency separations.

It will be investigated whether the thermal-detuning coefficients can be matched for all three resonances via dispersion engineering. In the present simulation, it is not assumed that this is the case, and the amount of thermal-induced detuning is set to be proportional to frequency, which is expected for most waveguide geometries. The second TRN reduction process is photothermal backaction [10,11,12,13]. In OPOs, the sidebands are generated by pumping on the blue-detuned side of the microresonator resonance. This allows for thermo-optic locking and laser cooling to reduce the thermal fluctuations. It has been shown theoretically that the temperature fluctuations can be reduced by a factor of 30 using a 10-Hz pump laser [12]. In addition, the low-TRN microresonators developed in the embodiments discussed above allow reduction of the thermal-induced detuning by reducing the thermorefractive coefficient. A modest 30-fold reduction of thermal-induced detuning is assumed through the combination of laser cooling and athermal structure. In principle, this can be achieved with either technology alone.

Figure 10:
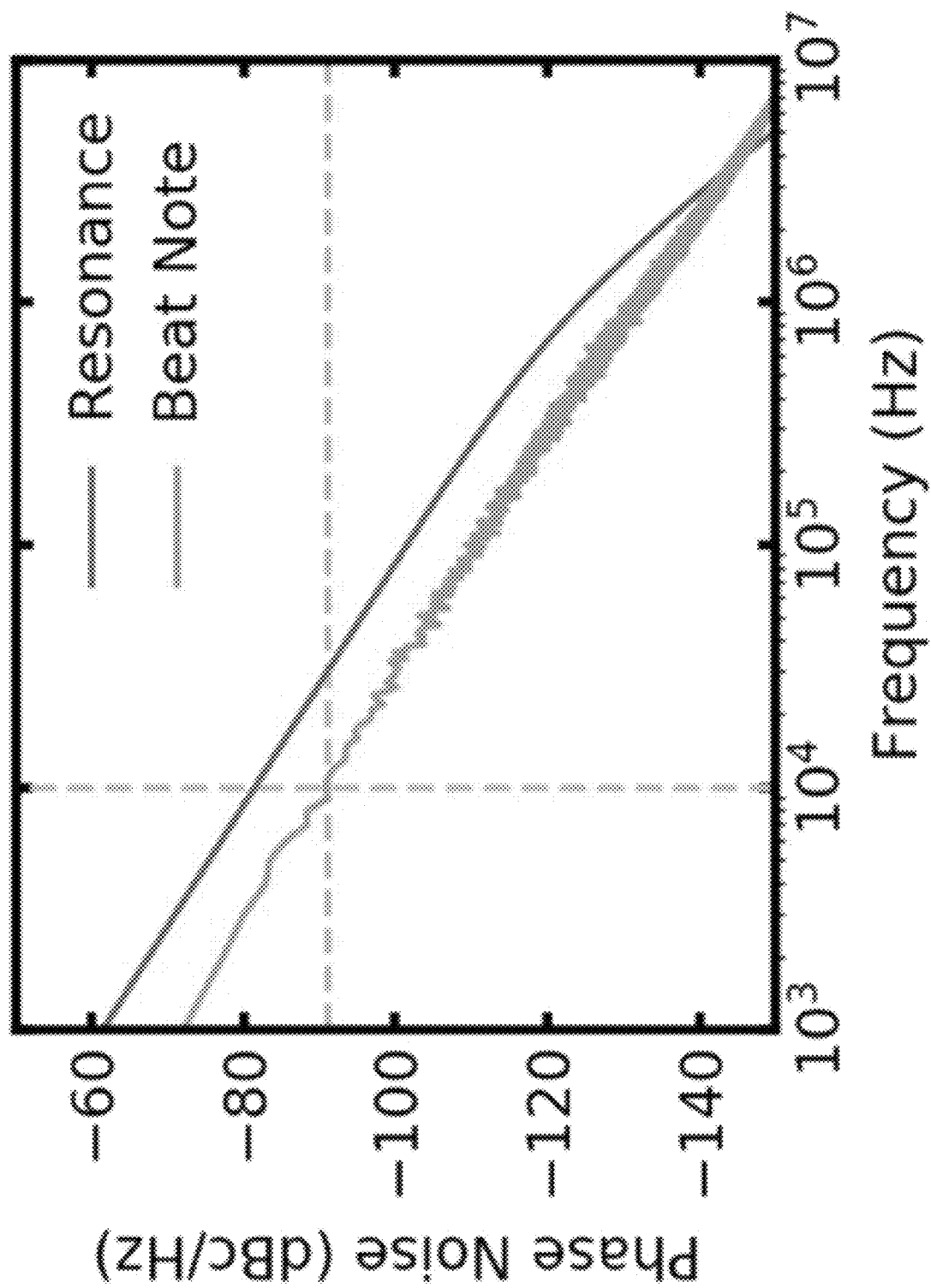
FIG. 10 illustrates a simulated thermal-fluctuation limited phase noise. The blue trace corresponds to the phase noise of the pump resonance, which is reduced in the beat note due to common-mode-noise rejection.

In addition, the TRN-induced phase noise can be simulated by combining the TRN model in [10] with OPO model, the result of which is shown in FIG. 10. The coupling between intensity and phase fluctuations are automatically included in the simulation. The phase-noise of the beat note is found to be 10-dB lower than the fluctuations of each resonance, which is due to common-mode-noise rejection. With laser cooling and athermal design, the TRN-induced phase noise is found to be −91 dBc/Hz observed at 10-kHz offset frequency, which is near the STL level.

In summary, the total phase noise of the OPO can be expressed by summing the contributions from STL, pump noise, and thermal noise, which yields −89 dBc/Hz at 10-kHz offset frequency. Combined with the 74-dB noise reduction from OFD, this allows surpassing of the Phase 2 noise metric at −163 dBc/Hz (See, e.g., Table 1).

TABLE 1

List of noise sources and their contributions to the phase noise of the generated microwave signal

| Noise Source | Contribution (dBc/Hz @ 10 kHz) |
| --- | --- |
| STL | −169 |
| Pump Phase Noise | −175 |
| Pump RIN | −184 |
| TRN | −165 |
| Total | −163 |

Development of Optical Frequency Division Module

Figure 11:
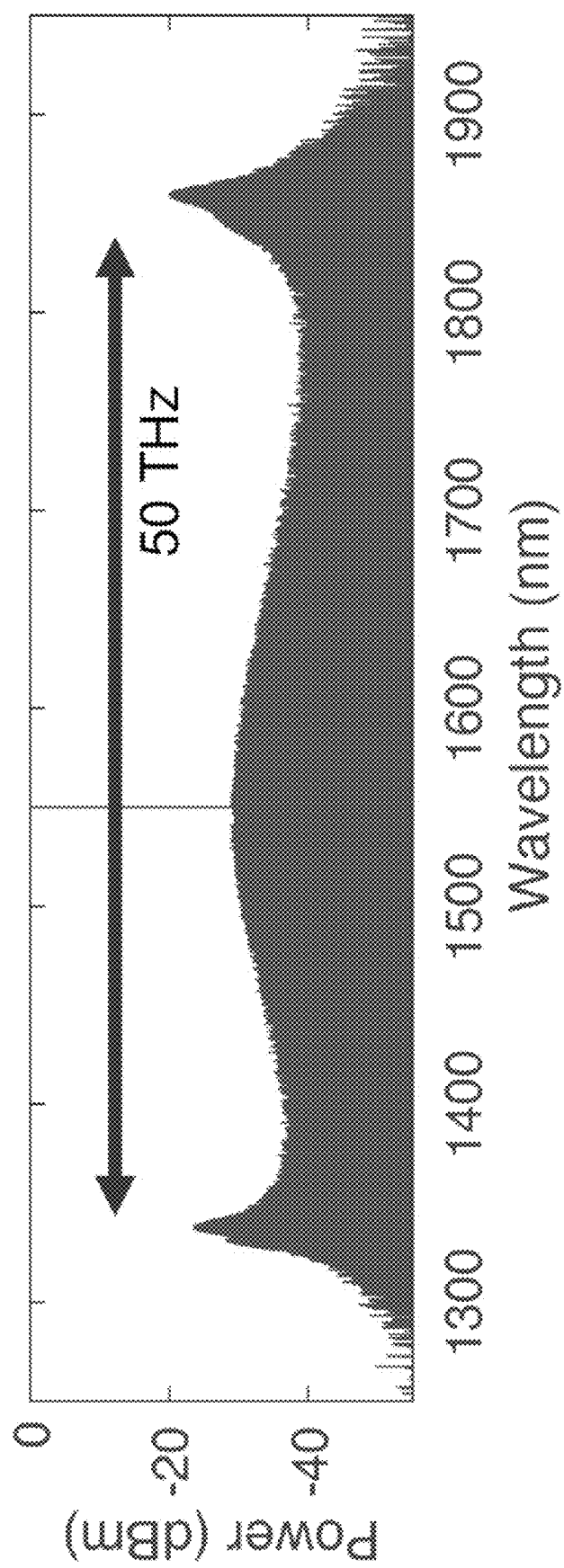
FIG. 11 illustrates a simulated spectrum for 50-GHz FSR, 730×2660-nm cross-section SiN microresonator.

Various embodiments include design and development of a dispersion-engineered SiN microresonator to realize a soliton-based Kerr frequency comb for OFD. The resonator cross-section will be engineered such that the generated soliton spans the 50-THz frequency difference between the two optical references described herein. FIG. 11 shows the simulated spectrum of a 50-GHz SiN microresonator for a pump at 1550 nm in which the dispersive waves at the spectral edges are engineered to provide spectral overlap with the optical reference described above. The modeling indicates that the comb line at the peak of the dispersive wave can have comb power >10 µW, which is sufficient for performing an offset lock [14].

Figure 12:
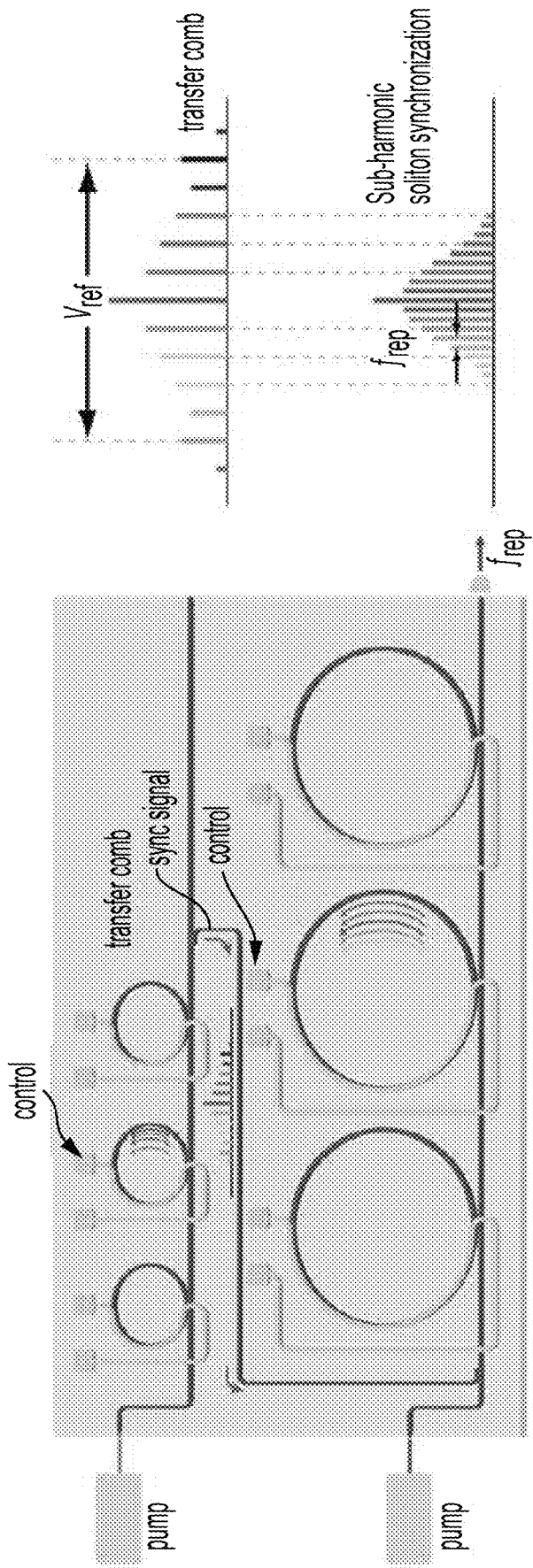
FIG. 12 illustrates a schematic of two stage approach for microwave generation. A common pump can be used to generate the large spacing transfer comb that is locked to the optically carried reference $v_{ref}$ and the final low-repetition rate comb. A coupling waveguide is used to send a portion of the transfer comb as a sync signal to the low repetition rate comb for sub-harmonic synchronization.

FIG. 12 shows the chip schematic with the OPO-based optically-carried reference and the Kerr comb OFD on the same chip. Microresonator-based add-drop filters can be used to detect the beat note between the Kerr comb and the OPO reference at the two sidebands given by $\delta_a = v_a \cdot mf_{rep} - f_{CEO}$ and $\delta_b = v_b - mf_{rep} - f_{CEO}$. The difference between these beat notes can be taken and used with a feedback loop actuating on the pump frequency to stabilize the Kerr comb spacing $f_{rep}$ [15]. For a microwave signal at 10-GHz, for example, the phase-noise reduction via OFD is 20×log(50 THz/10 GHz)=74 dB.

A 1-stage approach can be used, which directly generates a low repetition rate soliton comb at <18 GHz that spans the 50-THz bandwidth required to lock to the optically carried reference, or a 2-stage approach can be used, wherein a 50-GHz soliton transfer comb bridges a lower repetition rate (<18 GHz) soliton comb (FIG. 12). Although the proposed 2-stage approach seemingly adds complexity to the system, it allows mitigation of a low pump-to-comb conversion efficiency which is inherent to lower-FSR microresonators [16,17]. It is worth emphasizing that in order to achieve OFD, a broadband soliton Kerr comb that spans at least 50 THz and produces sufficient optical powers at the points of spectral overlap can be used. Recently, experimental verification [17] demonstrates that the conversion efficiency of a Kerr soliton comb scales favorably with the cavity FSR. A larger FSR also implies fewer comb lines over the soliton spectral bandwidth and it can thus be shown that the power per comb line scales as $\sim 1/N^2$, where N is the number of comb lines [18]. Based on the results of [17] and using parameters similar to those used in FIG. 8, the typical conversion efficiency of a 18-GHz-spacing soliton comb is estimated to be ~0.2%. This, combined with the distribution of the comb power over a large number of lines, could pose a significant challenge to the optical referencing. By increasing the FSR to 50 GHz, it is anticipated to cause almost an order-of-magnitude improvement in the power per comb line, which is expected to facilitate the detection and stabilization of the beat notes significantly. Once the soliton comb is stabilized to the reference OPO, the stability of this comb can be transferred to the low repetition rate (<18 GHz) soliton comb through sub-harmonic synchronization [19]. It has also been shown that by introducing a weak coupling from one soliton comb to another, it is possible to overcome a residual mismatch in the spacings of the two combs and lead to robust frequency-locking for the case of 1:1 synchronization [9] and sub-harmonic, harmonic, and harmonic-ratio regimes of synchronization [19].

To achieve >+5% tunability of the microwave frequency, an array of microresonators for the transfer comb can be used, which are coupled to the same bus waveguide (FIG. 12). The FSRs are chosen such that they are different subharmonics of the optically carried reference frequency. In order to generate a single transfer comb with the specific spacing, independent thermal tuning can be leveraged using integrated heaters to tune only one microresonator into resonance. Similarly, the present embodiments provide an array of microresonators that have FSRs that are an undertone of the transfer comb microresonators for generation of the low repetition rate comb for microwave generation and the stability of the transfer comb is imparted on the low repetition rate comb via sub-harmonic synchronization. For example, an array of 11 micoresonators can be used with varying FSRs to tune the transfer comb spacing from 47.5 to 52.6 GHz. By choosing a subharmonic factor of 3 for each transfer comb, a microwave frequency at 16.6 GHz can be generated with >+5% tunability and a resolution of 170 MHz. The microresonator array can be optimized based on the desired microwave output frequency.

Those skilled in the art also will readily appreciate that many additional modifications are possible in the exemplary embodiment without materially departing from the novel teachings and advantages of the invention. Accordingly, any such modifications are intended to be included within the scope of this invention as defined by the following exemplary claims.

REFERENCES

[1] N. L. B. Sayson et al., "Widely tunable optical parametric oscillation in a Kerr microresonators," Opt. Lett. 42, 5190 (2017).
[2] R. R. Domeneguetti, et al., A. L. Gaeta, and P. Nussenzveig, "Parametric sideband generation in CMOS-compatible oscillators from visible to telecom wavelengths," Optica 8, 316 (2021).
[3] N. L. B. Sayson et al., "Octave-spanning tunable parametric oscillation in crystalline Kerr microresonators," Nat. Photon. 13, 701 (2019).
[4] J. Li, H. Lee, T. Chen, and K. J. Vahala, "Characterization of a high coherence, Brillouin microcavity laser on silicon," Opt. Express 20, 20170 (2012).
[5] J. Li, et al., K. J. Vahala, "Electro-optical frequency division and stable microwave synthesis," Science 345, 309 (2014).
[6] E. Kenig, M. C. Cross, R. Lifshitz, R. B. Karabalin, L. G. Villanueva, M. H. Matheny, and M. L. Roukes, "Passive phase noise cancellation scheme," Phys. Rev. Lett. 108, 264102 (2012).
[7] A. B. Matsko, and L. Maleki, "Noise conversion in Kerr comb RF photonic oscillators," J. Opt. Soc. Am. B 32, 232 (2015).
[8] D. Huang et al., J. Bowers, "High-power sub-kHz linewidth lasers fully integrated on silicon," Optica 6, 745 (2019).
[9] J. K. Jang, et al., M. Lipson, and A. L. Gaeta, "Synchronization of coupled optical microresonators," Nat. Photon. 12, 688 (2018).
[10] G. Huang, E. Lucas, J. Liu, A. S. Raja, G. Lihachev, M. L. Gorodetskly, N. J. Engelsen, and T. J. Kippenberg, "Thermorefractive noise in silicon-nitride microresonators," Phys. Rev. A 99, 061801(R) (2019).
[11] J. Li, S. Diddams, and K. J. Vahala, "Pump frequency noise coupling into a microcavity by thermo-optic locking," Opt. Express 22, 14559 (2014).
[12] X. Sun, R. Luo, X.-C. Zhang, and Q. Lin, "Squeezing the fundamental temperature fluctuations of a high-Q microresonator," Phys. Rev. A 95, 023822 (2017).

[13] T. E. Drake, J. R. Stone, T. C. Briles, and S. B. Papp, "Thermal decoherence and laser cooling of Kerr microresonator solitons," Nat. Photon. 14, 480 (2020).

[14] S. Arafin et al., "Optical synthesis using Kerr frequency combs," 2017 Joint Conference of the European Frequency and Time Forum and IEEE International Frequency Control Symposium (EFTF/IFCS), 2017, pp. 534-537, doi: 10.1109/FCS.2017.8088950.

[15] T. Tetsumoto, T. Nagatsuma, M. E. Fermann, G. Navickaite, M. Geiselmann, and A. Rolland, "Optically referenced 300 GHz millimetre-wave oscillator," Nat. Photon. (2021). https://doi.org/10.1038/s41566-021-00790-2.

[16] J. Gartner, P. Trocha, R. Mandel, C. Koos, T. Jahnke, and W. Reichel, "Bandwidth and conversion efficiency analysis of dissipative Kerr soliton frequency combs based on bifurcation theory," Phys. Rev. A 100, 033819 (2019).

[17] J. K. Jang, Y. Okawachi, Y. Zhao, X. Ji, C. Joshi, M. Lipson, and A. L. Gaeta, "Conversion efficiency of soliton Kerr frequency combs," accepted for publication in Opt. Lett. (2021).

[18] C. Bao, Lin Zhang, A. Matsko, Y. Yan, Z. Zhao, G. Xie, A. M. Agarwal, L. C. Kimerling, J. Michel, L. Maleki, and A. E. Willner, "Nonlinear conversion efficiency in Kerr frequency comb generation," Opt. Lett. 39, 6126 (2014).

[19] J. K. Jang, et al., M. Lipson, and A. L. Gaeta, "Observation of Arnold tongues in coupled soliton Kerr frequency combs," Phys. Rev. Lett. 123, 153901 (2019).

All-Optical Frequency Division On-Chip Using a Single Laser

The generation of spectrally pure high-frequency microwave signals is a critical functionality in fundamental and applied sciences, including metrology and communications. The development of optical frequency combs has enabled the powerful technique of optical frequency division (OFD) to produce microwave oscillations of the highest quality. The approaches for OFD demonstrated to date demand multiple lasers with space- and energy-consuming optical stabilization and electronic feedback components, resulting in device footprints incompatible with integration into a compact and robust photonic platform. Various examples demonstrate all-optical OFD on a single photonic chip driven with a single continuous-wave laser. A dual-point frequency reference can be generated using the beat frequency of the signal and idler fields from a microresonator-based optical parametric oscillator (OPO), which achieves high phase stability due to the inherently strong signal-idler frequency correlations. OFD can be implemented by optically injecting the signal and idler fields from the OPO to a Kerr-comb microresonator on the same chip. Aspects further show that the two distinct dynamical states of Kerr cavities can be passively synchronized, allowing broadband frequency locking of the comb state, which transfers the stability of the OPO frequencies to the repetition rate of the Kerr comb. A 630-fold phase-noise reduction is observed when the Kerr comb is synchronized to the OPO, which represents the lowest noise generated on the silicon-nitride platform. Aspects of the present disclosure demonstrate a simple, effective approach for performing OFD and provides a pathway toward chip-scale devices that can generate microwave frequencies comparable to the purest tones produced in metrological laboratories. This technology can significantly boost the further development of data communications and microwave sensing.

Stable microwave sources are an indispensable tool in today's electronic devices, which serve as clocks and information carriers in applications including communication, sensing, and data processing. Two key aspects that are actively pursued for microwave sources are high-frequency generation and ultra-low-noise operation, which can lead to higher information capacity in communication and higher sensitivity in metrology. Most commercially available chip-scale microwave sources rely on mechanical high-Q oscillators with natural frequencies ranging from 10 kHz to 250 MHz. Synthesis of higher frequencies (for example, via phase-locked loops) from such low-frequency oscillators results in severe noise penalties due to frequency multiplication. To achieve the performance levels required for advanced applications such as metrology and high-speed data communications, various techniques have been developed for generating spectrally pure high-frequency microwaves, including electronic [1-4], microelectromechanical [5], and optoelectronic [6-8] methods. In particular, high-quality optical oscillators are readily available at frequencies exceeding 100 THz, and by implementing a suitable frequency-down-conversion scheme such as optical frequency division (OFD), microwave generation with a large noise suppression factor can be realized. This technique forms the basis of optical atomic clocks and yields the most precise microwave frequency generated to date [9, 10]. For low-phase-noise microwave generation, the narrow-linewidth-laser systems can be operated without cold atomic references. Furthermore, a two-point referencing scheme (FIG. 13A) removes the need for an octave-spanning comb [8, 11], further simplifying the setup. Nonetheless, such a system still requires multiple fast-tunable laser sources and multiple optical and electronic stabilization stages, resulting in a large, table-top level footprint [8, 11, 12], which does not meet the compactness and robustness required by many sensing and communication applications.

Aspects of the present disclosure propose and demonstrate an OFD scheme based on a photonic chip pumped with a single continuous wave (CW) laser, which is capable of a large-bandwidth noise reduction without feedback control or high-speed pump-frequency modulation. As shown in FIG. 13A, the top microresonator operates as an optical parametric oscillation (OPO), and the generated signal-idler pair produces a stable frequency reference due to phase-correlation-induced linewidth narrowing. In principle, the frequency separation between the OPO sidebands can reach an octave with proper dispersion engineering, which allows for large division factors. By optically coupling the OPO output to a mode-locked soliton comb, synchronization can occur, which locks the soliton repetition rate to a fraction of the OPO mode spacing despite their disparate temporal waveforms (FIG. 13E). Discrete narrow-linewidth microwave tones are generated with the lowest frequency component (non-DC) being the soliton repetition rate. A proof-of-concept experiment used a signal-idler frequency separation of 8 THz and a 200-GHz soliton comb to achieve a 20-dB repetition-rate-noise reduction of the synchronized state compared to free-running solitons that have previously been used for microwave generation [13, 14].

A critical performance metric of a microwave source is the phase noise, which is associated with time-dependent deviations of the source frequency from the nominal carrier frequency. Such phase fluctuations lead to imperfections in timing and frequency and impose an upper limit on the performance for many applications. The phase noise of a microwave signal resulting from OFD is fundamentally limited by that of the dual-point optical reference, which needs to be generated with ultra-low noise. It has been shown that in a nonlinear microresonator temporal patterns that fully fill the cavity, such as the OPO and Turing rolls, exhibit higher phase stability than localized patterns, such as cavity solitons [15]. This is mainly due to Kerr solitons existing in the red pump-cavity-detuning regime, which has higher nonlinear and thermal instabilities [16]. In addition, higher-order dispersion and Raman nonlinearity can lead to increased soliton-timing jitter [17-19] and higher sensitivity to thermal noise [20]. In contrast, OPOs exist in the blue-detuned regime and do not suffer from dispersive-wave formation or self-frequency shifts induced by higher-order dispersion and Raman nonlinearity, which suggests a promising solution for a stable, on-chip dual-point optical reference. Furthermore, the higher optical powers of OPOs allow for a narrow Schawlow-Townes linewidth (STL), which represents the fundamental spectral linewidth due to quantum fluctuations. Lastly, energy conservation imposes strong frequency correlations between the signal and idler modes, which can be exploited for OFD. Aspects discussed herein theoretically and experimentally demonstrate three key noise-suppression features of OPO including low STL, strong pump-noise rejection, and strong thermal-noise suppression, which make it an ideal dual-point optical reference for OFD. Furthermore, the energy-conservation requirement of the OPO resembles that of the soliton, making it possible to achieve synchronization via simple photonic coupling. In a previous work, an electro-optical comb was electronically locked to a Turing roll in a MgF$_2$ resonator [21]. However, for the pump-cavity detuning used in [21], the high stability similar to what OPO can possess was not observed, and the performance was on par with free-running solitons on similar platforms [19].

The phase $\psi$m of the microwave signal generated by OFD can be expressed as, $$\psi_m = \frac{(\psi_i - \psi_s)}{N} \quad (1)$$

where N is the division factor, and $\psi_s$ and $\psi_i$ are the phases of the OPO signal and idler, respectively, which can be described as random processes resulting from phase diffusion. The resulting power spectrum of $\psi_m$ shows a strong noise reduction by a factor of $1/N^2$ due to OFD and a complete rejection of common-mode fluctuations between the signal and idler phases, which constitute a large part of the classical noise in OPOs. The fundamental phase-noise limit corresponds to the STL of the signal and idler, which can be reached with sufficient common-mode-noise rejection. Based on the classical model and assuming the signal and idler have identical resonator Qs, their phase difference is described by, $$\frac{d}{dt}(\psi_i - \psi_s) = (k_s - k_i)\Delta T, \quad (2)$$

where $\Delta T$ is the time-dependent temperature variation, and $k_s$, $k_i$ are the coefficients of thermal-induced resonance shift for the signal and idler resonances, respectively. Notably, the pump noise is fully suppressed in the signal-idler phase difference. Such pump-noise suppression has been previously discussed in $\chi^{(2)}$- and $\chi^{(3)}$-based OPOs in the absence of thermal effects [17, 22], and similar principles have been used for low-noise microelectromechanical oscillators [23]. This shows that this suppression can be leveraged for OFD-based low-noise microwave generation. In general, $k_s$ and $k_i$ are proportional to the signal and idler frequencies, and thus have a non-zero difference. However, many low-thermorefractive-waveguide designs can be implemented to further mitigate this effect [24-26]. Theoretically, by incorporating a small amount of material with the opposite thermal coefficient of the core material, $k_s$=$k_i$ can be achieved even for far-separated frequencies (see, e.g., FIGS. 17-19). Notably, the k coefficient only needs to be matched at two wavelength points, which is achievable even for large wavelength separations. In addition, the OPO operates in the blue-detuned regime, which allows for laser cooling via thermo-optical backaction using sufficiently low-noise pump lasers [27-29]. Thus, the OPO provides an efficient approach to suppress classical noise sources that are intrinsic to the pump laser and waveguide material. The STL of the OPO signal, idler, and dual-point reference can be determined by performing a fully quantum-optical analysis of triply-resonant $\chi^{(3)}$-based OPO (FIGS. 17-19). Vacuum fluctuations result in a Lorentzian lineshape similar to those of lasers and $\chi^{(2)}$ OPOs [30] with a full-width-at-half-maximum (FWHM) linewidth of the dual-point reference given by, $$\Delta f_{ST} = \frac{\hbar \omega_s \kappa (\alpha_2 + \sigma_2)}{2\alpha P_s}, \quad (3)$$

where h is Planck's constant, $\omega_s$ is the angular frequency of the signal, $P_s$ is the output power of the signal, $\kappa$ is the output coupling rate, $\alpha$ is the cavity loss rate, and $\sigma$ is an additional linewidth broadening term due to the nonlinear-phase shift and phase mismatch (FIGS. 17-19). The individual linewidths of the signal and idler are $\Delta f_{ST}/4$ due to the phase correlations. Owing to the availability of high Q microresonators and the high output power of OPO states, sub-hertz STLs are readily achievable. Moreover, the dual point reference linewidth does not depend on its spectral separation, making it compatible with OFD with a large division factor.

Figures 14A, 14B, 14C, 14D, 14E:
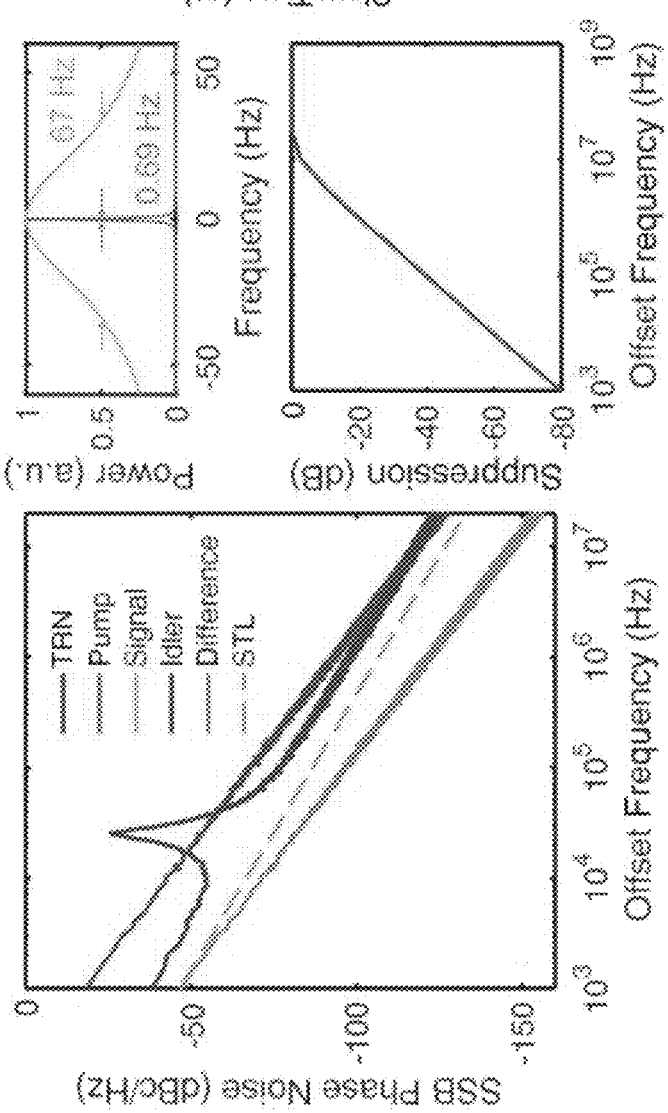
FIGS. 14A-14E provide numerical simulations of OPO noise and OPO-soliton synchronization.

Examples discussed herein numerically simulate the classical noise performance using stochastic equations, in which the thermorefractive noise (TRN) is modeled based on the experimental characterization of SiN device (see FIGS. 17-19). A Lorentzian-lineshape pump can be assumed with an FWHM linewidth of 2 kHz and a noise sidelobe at 22-kHz offset frequency, which represents the condition in experiments discussed herein. Pump-induced thermorefractive backaction was ignored and experiments simulate a microresonator with a free-spectral range (FSR) of 200 GHz and a loaded Q of $10^6$ (see FIGS. 17-19). FIG. 14A shows the power spectral density of the single-side-band (SSB) phase noise for different components of OPO. The pump-noise sidelobe is eliminated in the relative-phase-noise spectrum carried by the beat note of the signal and idler fields, which corresponds to >47-dB noise suppression. The residual relative-phase noise follows the TRN spectrum with a 29-dB reduction, in agreement with the analytical result of Eq. (2). The quantum-noise limit of the dual-point reference is plotted in dashed lines corresponding to an STL of 67 Hz, which can be further reduced by increasing the Q or the OPO power. For example, a sub-Hertz dual-point STL can be achieved by using a 50-GHz-FSR microresonator with a Q of $4\times10^6$ and a pump power of 400 mW (FIG. 14B).

OFD can be performed by synchronizing a soliton mode-locked Kerr comb to the stable reference provided by the OPO sidebands. Synchronization is an all-optical process that has been used to lock the comb spacing between two mode-locked Kerr combs via optical coupling, which has been demonstrated for unidirectional coupling from one microresonator to another [31-33], and the comb in the coupled secondary microresonator inherits the phases of the comb in the primary microresonator. Previous demonstrations have focused on dynamically similar states of Kerr resonators, namely solitons [31, 32] and nonsolitonic combs [33]. However, the OPO and soliton states are dynamically distinct, which can be shown using the bifurcation of the homogeneous (i.e., only keeping the pump mode) solutions plotted as a function of normalized intracavity power against normalized detuning [34-36]. As shown in FIG. 13B, the OPO state exists in the blue-detuned branch (left solid trace), while the soliton state exists in the red-detuned branch (right solid trace). The corresponding temporal waveforms are shown in FIG. 13E, which have distinct shapes. The synchronization of such dynamically different waveforms has been an open question.

The OPO-soliton synchronization process is first simulated using the model in [31]. As shown in FIGS. 14 and 14E, the deviation of the soliton-repetition rate from the desired value manifests as a drift in the fast-time frame. A unidirectional power coupling of $7.3 \times 10^{-6}$ per roundtrip time can be numerically introduced (see FIGS. 17-19), which traps the soliton peak to one of the OPO peaks. Consequently, the soliton-repetition rate is synchronized to a fraction of the OPO-mode spacing. The maximum noise suppression capability of this configuration can be theoretically investigated by numerically implementing an absolutely stable OPO (FIGS. 17-19). FIG. 14 shows the ratio between the residue noise strength and the initial noise strength of the repetition rate of the soliton comb. The synchronization scheme provides limited noise suppression for noise at frequencies comparable to the cavity linewidth. However, at lower offset frequencies, the noise suppression strength increases by 20 dB/decade, reaching −59 dB at 10-kHz offset frequency. Further improvement of the noise suppression bandwidth can be achieved by increasing the soliton-cavity linewidth or the coupling strength.

In an experiment, a single CW source at 1557 nm can pump both the OPO and soliton-comb resonator. The two microresonators have an FSR of 227 GHz and are identical in design. The cross-section of various SiN waveguides measures 730×1500 nm$^2$ with a ring-bus coupling gap of 350 nm and a gap for the coupling link being 450 nm, which provides a much lower coupling rate than the intrisic loss of the cavity. A single pump laser is split on-chip with 24 mW going into the OPO ring and 370 mW going into the soliton ring. The soliton pump power can be reduced in future designs by adjusting the on-chip slitting ratio for more power efficient operations. The sidebands of the OPO are located at 1526.5 nm and 1588.8 nm, corresponding to a frequency separation of 7.7 THz and a mode separation of 34. The optical spectra of the OPO and soliton comb are shown in FIGS. 15B and 15C. To facilitate synchronization, the beat note can be monitored between the OPO and the soliton line at 1588.8 nm. This beat note can be tuned by tuning the heater power applied to the soliton (FIG. 15A), which is sensitive to thermal fluctuations. The existence of a beat note indicates the OPO and soliton running independently, which corresponds to a heater power <28.3 mW or >28.6 mW and a beat note frequency >11 MHz. Near the two threshold heater powers, the beat note jitters rapidly between DC and 11 MHz, indicating the soliton being captured by the OPO and then slipping away in short timescales. For a heater range between 28.4 mW and 28.5 mW, the beat note vanishes, indicating stable synchronization. Based on the heater values, a capturing range of ≈10 MHz can be inferred, which can be further increased by adopting stronger coupling or higher OPO power.

An important result of synchronization is reduced soliton-phase noise, which can be measured using a modified delayed self-heterodyne technique that enables measurement of both the absolute phase noise of the individual optical fields and the relative phase noise between the two components (FIG. 13D) [44, 45]. FIG. 15E shows the SSB phase noise of the OPO, where the yellow and red curves correspond to the phase noise of the pump and the OPO signal (1588.8 nm), respectively, and the blue curve corresponds to the relative phase noise between the OPO signal and idler. The pump noise has a strong peak at 22 kHz (blue-shaded region), which is reduced by 22 dB in the relative phase noise as predicted by theoretical analysis [Eq. (2)]. The residual noise is due to the slight cavity lifetime difference between the signal and idler modes due to wavelength-dependent ring-bus coupling. The room-temperature TRN of the microresonator was characterized using the homodyne measurement proposed in [46], which yields a result that largely agrees with the experimental characterization shown in [47]. The OPO relative noise is found to be 13 dB lower than the TRN due to common-mode noise rejection. The current limit of OPO phase noise to the relatively large intensity and phase noise can be attributed to the pump laser, which leads to optical heating instead of cooling [27-29] via the thermorefractive effect. An off-chip laser intensity stabilization loop is further employed in the current experiment using a general purpose proportional-integral-derivative (PID) controller (FIG. 15D) and a photodetector. A stronger noise suppression can be achieved using customized algorithms. Employing a microresonator with a larger mode volume or athermal designs (FIGS. 17-19) can also reduce the effect of TRN and intensity noise [24-26, 47]. FIG. 15F shows the relative phase noise between two adjacent soliton-comb lines when the soliton is free-running (red) and is synchronized to the OPO (purple). In the latter case, a 28-dB reduction in the phase noise is observed, confirming the large phase-noise reduction with OPO-soliton synchronization.

Furthermore, a strong noise recoil that presents in electronic locking systems where, at certain frequency bands, the negative feedback turns into positive feedback is not observed. For reference, the relative phase noise of the OPO sidebands is plotted in blue, which is 31 dB higher than the relative noise between adjacent soliton lines, in agreement with the division factor $N^2=1156$. The noise-reduction bandwidth exceeds 300 kHz, which is only limited by the detector noise floor rather than the synchronization process. The free-running soliton noise is limited by the control signal applied to the integrated heater (see FIGS. 15-17) which is necessary for soliton generation [48]. The OPO is generated at low heater voltage due to the more robust generation process. However, a small TRN increase is introduced to the OPO ring due to the thermal cross talk from the soliton ring. The soliton noise can also be characterized without applied heat by first generating the soliton using thermal tuning, then jointly tuning the laser wavelength and the heater until the heater can be turned off without destroying the soliton state. This is shown as the yellow trace in FIG. 15F, where the noise is nonetheless 18 dB higher than the synchronized soliton.

Microwave phase noise is often characterized at the 10-kHz offset frequency by scaling the carrier frequency to 10 GHz. The free-running soliton in this experiment corresponds to a noise level of −86 dBc/Hz, whereas the synchronized soliton corresponds to −114 dBc/Hz. The latter is 4 dB lower than the 10-GHz microwave generated by the free-running soliton in [13], which was the lowest based on the SiN platform. Notably, the device used in this experiment has an inherently larger TRN than [113] due to a significantly smaller mode volume. The OPO noise of a larger-volume resonator (FSR=20 GHz) is characterized and shown in FIGS. 16A and 16B. A 10-GHz equivalent noise of −125 dBc/Hz is inferred, which is 15-dB lower than [13] and also lower than OFD with chip-based Brillouin lasers [8]. It is also worth noting that the 20-GHz cavity can occupy an area of 566×417 µm$^2$ (FIG. 16A, inset), which is much smaller than typical Brillouin laser cavities. Aspects also examine the transfer of phase noise from the pump to the soliton, which is the dominant noise source for free-running 10-GHz solitons [13], where a transfer coefficient of −55 dB was observed. The 227-GHz-soliton noise is largely limited by TRN. However, using the pump noise peak at 22 kHz (blue-shaded region), a pump-to-soliton-noise transfer coefficient of −39 dB can be inferred for the free-running soliton without heater bias. As a comparison, the transfer coefficient is −51 dB for the synchronized soliton at 227 GHz, and it was inferred that a transfer coefficient of −78 dB if a 10-GHz soliton is synchronized based on the N$^2$ noise scaling. Further reduction of noise can be achieved with athermal designs, where a thermorefractive coefficient reduction of more than 100× has been demonstrated [49], corresponding to a TRN reduction of 40 dB. The STL limit can be reduced by increasing the power of OPO or the signal-idler separation via dispersion engineering, which increases the division factor. 10-GHz microwave can reach a noise level around −170 dBc/Hz using bulk optical equipments such as monolithic-cavity modelocked lasers [43, 50] or fully stabilized combs [51]. Comparable performance (<−165 dBc/Hz) can be envisioned with an on-chip-OFD scheme with a TRN reduction of 40 dB, OPOspan of 50 THz, and dual-point STL of 0.2 Hz, which are readily achievable with the current technological capabilities. FIG. 16D shows a comparison of the recent advances of microwave generation in compact optical devices, plotted as the phase noise at the 10-GHz or equivalent carrier frequency and 10-kHz offset frequency versus the size of the main structure that provides the phase stability, including the optical delay for optoelectronic oscillators (OEO) [37-39], Brillouin laser cavites [8, 11, 40-42], OPO (this work) or Turing roll [21] cavites, and frequency-comb cavities for the free-running scheme [13, 19, 43]. The pump lasers and electro-optical modulators are not included. Optical fibers are assumed to occupy an area of 2 cm in diameter which results in a loss of <0.5 dB/loop for the typical SMF-28® fiber. As shown in the figure, larger structural size yields better noise performance as the TRN is reduced. However, the synchronized 227-GHz soliton (dot i) achieves the lowest phase noise on the SiN platform while occupying the smallest footprint. A further 11-dB improvement can be achieved by increasing the OPO footprint (dot ii), which surpasses the performance of lower-TRN platforms such as SiO$_2$ and MgF$_2$-based whispering-gallery-mode resonators.

Based on the synchronization of low-noise OPO and Kerr comb, a compact, ultra-low-noise, broadly tunable, high-frequency microwave oscillator can be envisioned. FIG. 16C shows a possible design of a full system. A broad-band reference OPO is generated in the top athermal ring which is evanescently coupled to the middle bus waveguide to facilitate synchronization. Multiple microresonators with different mode spacings in the microwave V to W band are used for broad-band soliton generation. The on-chip heaters are used to control which microresonator is activated via frequency detuning. V to W band microwave frequencies are generated upon photodetection of the middle-level comb. To further divide the frequency to the microwave X to K bands, low-FSR microresonators can be implemented on the bottom level, which can have a narrow bandwidth to achieve higher efficiency [52, 53]. However, narrow bandwidth combs result in small division factors which can limit the achievable phase noise. This can be addressed by synchronizing the low-FSR comb to the larger-FSR comb, which corresponds to a harmonic synchronization scheme [32]. The cascading allows the narrow-band low-FSR comb to have an effective bandwidth identical to the larger-FSR comb to achieve a large division factor and hence low phase noise after OFD. X to K band microwave signals are generated upon photodetection of the bottom-level comb.

In conclusion, aspects of the present disclosure demonstrate an ultra-compact frequency division scheme based on passive synchronization of a low-noise OPO and Kerr-soliton comb, which requires only a single pump laser. This demonstration shows, for the first time, that dynamically different states in Kerr cavities can be passively synchronized via physical coupling. In particular, a phase-noise reduction of 28 dB is observed between free-running and phase-referenced solitons, which enabled a record-low soliton-phase noise on the SiN platform. In addition, aspects demonstrate that the OPO state can serve as ultra-stable optical references due to three key features, namely low STL, strong pump-noise suppression, and strong thermal-noise suppression. The OFD scheme allows for high performance microwave generation using a single laser with modest noise performance, which provides a promising pathway toward small-footprint ultra-low-noise microwave generation.

Methods

Phase-Noise Characterization System. The phase-noise characterization system is shown in FIG. 13D, which consists of an imbalanced Mach-Zehnder interferometer (MZI) and an electronic-mixing stage. A fiber delay of 200 m is used to extend the length of the bottom MZI arm, and an acusto-optic oscillator (AOM) is placed in the top arm of the MZI to shift the optical frequency by 80 MHz. A fiber-based polarization controllers is used to match the polarization of the two MZI arms, which is not shown in the figure. The fields at the end of the upper and lower MZI arms can be written as, $$\tilde{E}_u = E e^{i(\omega + \Delta\omega)t + i\tilde{\psi}(t) + i\tilde{\phi}_{AOM}(t)}, \quad (4)$$

$$\tilde{E}_l = E e^{i\omega(t+\tau) + i\tilde{\psi}(t+\tau) + i\tilde{\phi}_{fiber}(t)}, \quad (5)$$

where ω is the laser carrier frequency, Δω is the 80-MHz AOM frequency shift, τ is the time delay through the 200-m fiber delay, ψ̃(t) is the laser phase at time t excluding the carrier phase, φ̃$_{AOM}$ is the AOM phase at time t excluding the carrier phase, and φ̃$_{fiber}$(t) is the added phase due to fiber fluctuations. The detected AC-coupled voltage after the fiber beam splitter is, $$V \propto \cos[\Delta\omega t + \omega\tau + \tilde{\psi}(t+\tau) + \tilde{\phi}_{AOM}(t) - \tilde{\phi}_{fiber}(t)]. \quad (6)$$

where ωτ is a fixed phase offset that does not affect the noise. The phase noise of V can be expressed as, $$L_V(f) = 4\sin^2(\pi\tau f)L_\psi(f) + L_{AOM}(f) + L_{fiber}(f), \quad (7)$$

where $L_\psi$, $L_{AOM}(f)$ and $L_{fiber}(f)$ are the phase noise spectra of the laser, AOM, and fiber, respectively. In various examples, it can be assumed that the laser, AOM, and fiber noise are uncorrelated due to their different origins. In general, the AOM noise is much lower than the laser noise due to its lower carrier frequency, which can be ignored. The fiber noise is high at low offset frequencies but quickly reduces for frequencies above 1 kHz. Thus, $L_V$ reflects the laser noise up to a known sinusoidal modulation with increased sensitivity for higher offset frequencies.

To measure the noise correlation of two wavelengths, a first measure of a self-heterodyne beatnote with separate photodetectors get, $$V_1 \propto \cos[\Delta\omega\, t + \tilde{\psi}_1(t) - \tilde{\psi}_1(t+\tau) + \tilde{\phi}_{AOM}(t) - \tilde{\phi}_{fiber}(t)], \quad (8)$$

$$V_2 \propto \cos[\Delta\omega\, t + \tilde{\psi}_2(t) - \tilde{\psi}_2(t+\tau) + \tilde{\phi}_{AOM}(t) - \tilde{\phi}_{fiber}(t)], \quad (9)$$

where the constant phase terms are ignored. The frequency of $V_1$ can be upshifted using a frequency mixer and a local oscillator (LO) at 109 MHz, which yields, $$V_1' \propto \cos[(\Delta\omega + \omega_{LO})t + \tilde{\psi}_1(t) - \tilde{\psi}_1(t+\tau) + \tilde{\phi}_{AOM}(t) - \tilde{\phi}_{fiber}(t) + \tilde{\phi}_{LO}(t)]. \quad (10)$$

A second frequency mixer performs difference-frequency generation between V' and $V_2$, which yields, $$V_3 \propto \cos[\omega_{LO}t + \tilde{\psi}_1(t) - \tilde{\psi}_1(t+\tau) - \tilde{\psi}_2(t) + \tilde{\psi}_2(t+\tau) + \tilde{\phi}_{LO}(t)], \quad (11)$$

which has removed the AOM and fiber noise. The phase noise of $V_3$ corresponds to, $$\mathcal{L}_{V3}(f) = 4\sin^2(\pi\tau f)\mathcal{L}_{\Delta\psi}(f) + \mathcal{L}_{LO}(f), \quad (12)$$

where $\mathcal{L}_{\Delta\phi}$ is the relative phase noise between the two lasers, and $\mathcal{L}_{LO}(f)$ is the phase noise of the LO. With a sufficiently low LO noise, $\mathcal{L}_{V3}$ give a direct measurement of the relative phase noise of the lasers up to a known sinusoidal modulation.

Schawlow-Townes Linewidth of $\chi^{(3)}$-Based OPO

The Schawlow-Townes linewidth (STL) represents the fundamental linewidth of an optical oscillator, which is induced by the quantum fluctuations of related fields. Due to the extremely low occupation number of thermal photons at room temperatures, the only quantum fluctuations contributing to the STL of an OPO are vacuum fluctuations. The $\chi^{(3)}$-based OPO process with vacuum fluctuations can be modeled as, $$\frac{d\hat{A}}{dt} = -\frac{\alpha}{2}\hat{A} - i\Delta_A i\hat{A} + i\Gamma(\hat{A}^\dagger\hat{A} + 2\hat{B}^\dagger\hat{B} + 2\hat{C}^\dagger\hat{C})\hat{A} + i2\Gamma\hat{A}^\dagger\hat{B}\hat{C} + \sqrt{\kappa}A_{in} + \sqrt{\alpha}\hat{a}_{in}, \quad (S1)$$

$$\frac{d\hat{B}}{dt} = -\frac{\alpha}{2}\hat{B} - i\Delta_B\hat{B} + i\Gamma(2\hat{A}^\dagger\hat{A} + \hat{B}^\dagger\hat{B} + 2\hat{C}^\dagger\hat{C})\hat{B} + i\Gamma\hat{C}^\dagger\hat{A}^2 + \sqrt{\alpha}\hat{b}_{in}, \quad (S2)$$

$$\frac{d\hat{C}}{dt} = -\frac{\alpha}{2}\hat{C} - i\Delta_C\hat{C} + i\Gamma(2\hat{A}^\dagger + 2\hat{B}^\dagger\hat{B} + \hat{C}^\dagger\hat{C})\hat{C} + i\Gamma\hat{B}^\dagger\hat{A}^2 + \sqrt{\alpha}\hat{c}_{in}, \quad (S3)$$

where $\hat{A}$, $\hat{B}$, and $\hat{C}$ are the annihilation operators of the cavity modes for the pump, signal, and idler fields, respectively, $\alpha$ is the loss rate of the cavity, $\Delta_A$, $\Delta_B$, and $\Delta_C$ are the detunings of the pump, signal and idler modes, respectively, $\Gamma$ is the cavity-enhanced nonlinear coefficient, $\kappa$ is the input coupling rate, $A_{in}$ is the input field as a c-number, and $\hat{\alpha}_{in}$, $\hat{b}_{in}$, and $\hat{c}_{in}$ are the Langevin noise operators resulting from coupling to reservoirs with continuous mode spectra. Detunings can be defined such that $\Delta_{A,B,C} > 0$ when the field is red detuned. The nonlinear coefficient can be expressed as, $$\Gamma = \frac{3\hbar\omega_A^2\chi^{(3)}}{4\varepsilon_0 n_{eff}^2 n_g^2 V}, \quad (S4)$$

where h is Planck's constant, $\omega_A$ is the pump angular frequency, $\chi^{(3)}$ is the Kerr nonlinear coefficient, $\varepsilon_0$ is the vacuum dielectric coefficient, $n_{eff}$ is the effective index of the pump, $n_g$ is the group index of the pump, and V is the mode volume. Since the vacuum fluctuations are much weaker than the mean photon numbers in the OPO state, Eqs. (S1)-(S3) can be linearized by rewriting the operators in terms of their mean values and fluctuations as, $$\hat{O} = (O + \hat{u}_o + i\hat{v}_o)e^{i\phi_o}, \quad (S5)$$

where $O \in \{A, B, C\}$. The convention can be chosen such that O is a positive number and $\hat{u}_o$ and $\hat{p}_o$ are Hermitian operators. Similarly, $\hat{a}_{in}$, $\hat{b}_{in}$, and $\hat{c}_{in}$ can be expanded as, $$\hat{o}_{in} = \hat{g}_o + i\hat{h}_o, \quad (S6)$$

where $o \in \{a, b, c\}$, and $\hat{g}_o$ and $\hat{h}_o$ are Hermitian operators satisfying the relations, $$\langle \hat{g}_o(t)\hat{g}_o(t')\rangle = \langle \hat{h}_o(t)\hat{h}_o(t')\rangle = \frac{1}{4}\delta(t-t'), \quad (S7)$$

$$\langle \hat{g}_o(t)\hat{h}_o(t')\rangle = \langle \hat{h}_o(t')\hat{g}_o(t)\rangle^* = \frac{i}{4}\delta(t-t'). \quad (S8)$$

The operator equations after linearization reads, $$\frac{d}{dt}\begin{pmatrix}\hat{u}_a\\\hat{v}_a\\\hat{u}_b\\\hat{v}_b\\\hat{u}_c\\\hat{v}_c\end{pmatrix} = M\begin{pmatrix}\hat{u}_a\\\hat{v}_a\\\hat{u}_b\\\hat{v}_b\\\hat{u}_c\\\hat{v}_c\end{pmatrix} + \sqrt{\alpha}\begin{pmatrix}\hat{g}_a\\\hat{h}_a\\\hat{g}_b\\\hat{h}_b\\\hat{g}_c\\\hat{h}_c\end{pmatrix}, \quad (S9)$$

where $M = \{m_{ij}\}_{6\times 6}$ with coefficients $m_{11} = -\alpha/2 + 2\Gamma BC \sin\phi$, $m_{12} = -\Gamma(A^2 + 2B^2 + 2C^2 + 2BC \cos\phi) + \Delta_A$, $m_{13} = 2\Gamma AC \sin\phi$, $m_{14} = 2\Gamma\alpha C \cos\phi$, $m_{15} = 2\Gamma AB \sin\phi$, $m_{16} = 2\Gamma AB \cos\phi$, $m_{21}=\Gamma(3A^2+2B^2+2C^2+2BC\cos\phi)-\Delta_A$, $m_{22}=-\alpha/2-2\Gamma BC\sin\phi$, $m_{23}=\Gamma(4AB+2AC\cos\phi)$, $m_{24}=2\Gamma AC\sin\phi$, $m_{25}=\Gamma(4AC+2AB\cos\phi)$, $m_{26}=2\Gamma AB\sin\phi$, $m_{31}=-2\Gamma AC\sin\phi$, $m_{32}=-2\Gamma AC\cos\phi$, $m_{33}=-\alpha/2$, $m_{34}=-\Gamma(2A^2+B^2+2C^2)+\Delta_B$, $m_{35}=-\Gamma A^2\sin\phi$, $m_{36}=\Gamma A^2\cos\phi$, $m_{41}=\Gamma(4AB+2AC\cos\phi)$, $m_{42}=-2\Gamma AC\sin\phi$, $m_{43}=\Gamma(2A^2+3B^2+2C^2)-\Delta_B$, $m_{44}=-\alpha/2$, $m_{45}=\Gamma(4BC+A^2\cos\phi)$, $m_{46}=\Gamma A^2\sin\phi$, $m_{51}=-2\Gamma AB\sin\phi$, $m_{52}=-2\Gamma AB\cos\phi$, $m_{53}=-\Gamma A^2\sin\phi$, $m_{54}=\Gamma A^2\cos\phi$, $m_{55}=-\alpha/2$, $m_{56}=-\Gamma(2A^2+2B^2+C^2)+\Delta_C$, $m_{61}=\Gamma(4AC+2AB\cos\phi)$, $m_{62}=-2\Gamma AB\sin\phi$, $m_{63}=\Gamma(4BC+A^2\cos\phi)$, $m_{64}=\Gamma A^2\sin\phi$, $m_{65}=\Gamma(2A^2+2B^2+3C^2)-\Delta_C$, and $m_{66}=-\alpha/2$, where $\phi=2\phi_A-\phi_B-\phi_C$.

Equation (S9) can be readily solved in the frequency domain with the Fourier transform, $$\hat{o}(\omega)=\frac{1}{\sqrt{2\pi}}\int_{-\infty}^{\infty}\hat{o}(t)e^{i\omega t}dt, \quad (S10)$$

where $o\in\{u_a, v_a, u_b, v_b, u_c, v_c, g_a, h_a, g_b, h_b, g_c, h_c\}$. The power spectral density of phase fluctuations of the signal can be evaluated as, $$S(\omega)=\int\frac{\langle\hat{v}_b(\omega)\hat{v}_b(\omega')\rangle}{B^2}d\omega', \quad (S11)$$

where $-v_b$ is a function of the frequency-domain noise operators satisfying, $$\langle\hat{g}_o(\omega)\hat{g}_o(\omega')\rangle=\langle\hat{h}_o(\omega)\hat{h}_o(\omega')\rangle=\frac{1}{4}\delta(\omega-\omega'), \quad (S12)$$

$$\langle\hat{g}_o(\omega)\hat{h}_o(\omega')\rangle=\langle\hat{h}_o(\omega')\hat{g}_o(\omega)\rangle^*=\frac{i}{4}\delta(\omega-\omega'), \quad (S13)$$

In general, inverting M yields a complicated expression that needs to be evaluated numerically. However, in the current case where the signal and idler modes have identical loss rates, M can be simplified to yield a simple analytical approximation. First, the steady-state equations can be investigated:

$$\frac{\alpha}{2}A+i\Delta_A A-i\Gamma(A^2+2B^2+2C^2)A-i2\Gamma ABCe^{-i\phi}=\sqrt{\kappa}A_{in}e^{-i\phi_A}, \quad (S14)$$

$$\frac{\alpha}{2}B+i\Delta_B B-i\Gamma(2A^2+B^2+2C^2)B-i\Gamma A^2Ce^{i\phi}=0, \quad (S15)$$

$$\frac{\alpha}{2}C+i\Delta_C C-i\Gamma(2A^2+2B^2+C^2)C-i\Gamma A^2Be^{i\phi}=0. \quad (S16)$$

With some manipulation, the following relations yield $$B=C, \quad (S17)$$

$$\Delta_B=\Delta_C, \quad (S18)$$

$$\Gamma A^2\sin\phi=-\frac{\alpha}{2}, \quad (S19)$$

$$\Delta_B-\Gamma(2A^2+3B^2)=\Gamma A^2\cos\phi. \quad (S20)$$

Furthermore, the typical STL of an OPO is much lower than the cavity linewidth. Using the relation between phase-noise spectrum and laser linewidth [S1], only the lowest order of $\omega$ contributes to the linewidth. With some calculation, these terms can be defined as, $$\bar{v}_b=i\frac{\alpha[\hat{h}_c(\omega)-\hat{h}_b(\omega)]-2(\Delta_B-2\Gamma A^2-2\Gamma B^2)[\hat{g}_c(\omega)-\hat{g}_b(\omega)]}{2\sqrt{\alpha}\,\omega}. \quad (S21)$$

Subsequently, the phase-noise spectrum can be:

$$S(\omega)=\frac{\alpha^2+4(\Delta_B-2\Gamma A^2-2\Gamma B^2)^2}{4\alpha\omega^2 B^2}. \quad (S22)$$

which correspond to the single-sideband (SSB) phase noise of, $$\mathcal{L}(f)=\frac{\alpha^2+4(\Delta_B-2\Gamma A^2-2\Gamma B^2)^2}{8\pi\alpha f^2 B^2}. \quad (S23)$$

where $f$ is the offset frequency. This represents a Brownian diffusion process that is found in many oscillator systems. The corresponding linewidth can be found as, $$\Delta f_{ST}=\frac{\hbar\omega_B\kappa[\alpha^2+4(\Delta_B-2\Gamma A^2-2\Gamma B^2)^2]}{8\alpha P_B}. \quad (S24)$$

where $P_B$ is the output power of the signal with $P_B=\hbar\omega_B\kappa B^2$.

Figure 17A:
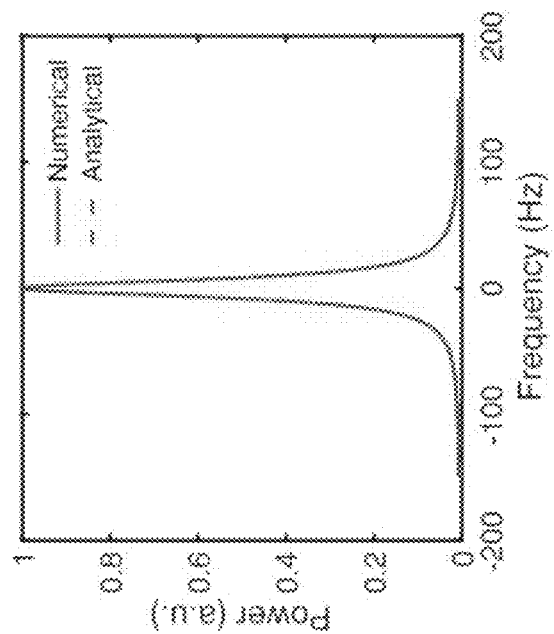
FIG. 17A illustrates the intracavity optical spectrum in the 3-mode model.
Figure 17B:
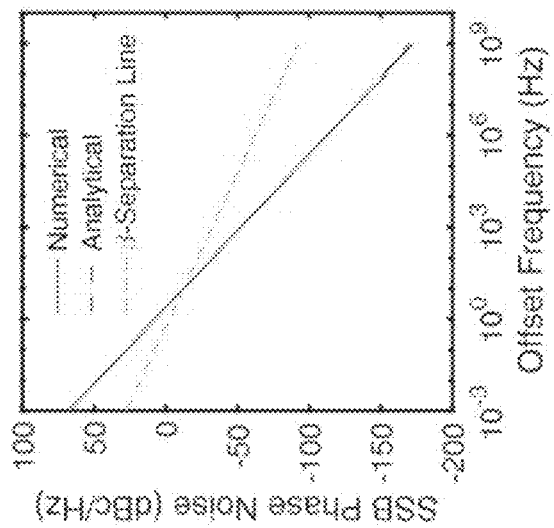
FIG. 17B illustrates a comparison of vacuum-fluctuation-limited phase noise between the numerical solution of Eq. (S9) (blue trace) and the analytical solution of (S23) (red trace). The β-separation line is also plotted, which indicates the part of phase noise that determines the laser linewidth.
Figure 17C:
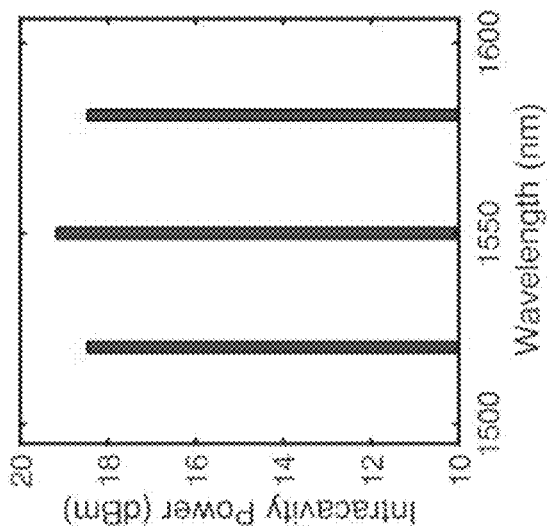
FIG. 17C illustrates the laser linewidth calculated by numerically integrating the blue trace in FIG. 17B. The Lorentzian lineshape with an FWHM given in Eq. (S24) is shown as the red trace.

As an example, an OPO can be simulated with $\alpha=2\pi\times 200$ MHz, $\Delta_A=2\pi\times 100$ MHz, and $\kappa=2\pi\times 100$ MHz. 20 mW of pump power can be used, corresponding to $|A_{in}|^2=1.6\times 10^{15}$ photons/s. In addition, a free-spectral range of 200 GHz can be chosen and a group-velocity dispersion (GVD) of $-25$ ps$^2$/km, corresponding to the OPO signal and idler at 1581.0 nm and 1520.2 nm, respectively, and $\Delta_B+\Delta_C-2\Delta_A=1.97$ GHz. The OPO optical spectrum is shown in FIG. 17A, where the cascaded OPO lines can be ignored due to their low powers. The phase-noise power spectrum can be numerically solved using Eq. (S9), which is shown as the blue trace in FIG. 17B. The analytical solution is plotted as the red trace, which only slightly deviates from the numerical solution at offset frequencies comparable to the cavity linewidth. The β-separation line has been used to identify the phase noise that contributes to laser linewidths [S1], which is plotted in orange in FIG. 17B. The laser linewidth is largely determined by the offset frequencies lower than the intersection point between the β-separation line and the noise spectrum, which is much lower than the cavity linewidth. This justifies the choice of keeping the lowest order of ω. The STL-limited OPO lineshape can be calculated numerically by integrating the blue trace in FIG. 17B [S1], which is shown as the blue trace in FIG. 17C. The numerical result shows excellent agreement with a Lorentzian curve with full-width-at-half-maximum (FWHM) linewidth given by Eq. (S24).

Classical Noise Sources of $\chi^{(3)}$-Based OPO

The classical dynamics can be modeled analogously to the quantum dynamics of Eqs. (S1)-(S3). The symbol indicates classical random processes, which yields the dynamical equations, $$\frac{d\tilde{A}}{dt}=-\frac{\alpha}{2}\tilde{A}-i\Delta_A\tilde{A}+i\Gamma(\tilde{A}^*\tilde{A}+2\tilde{B}^*\tilde{B}+2\tilde{C}^*\tilde{C})\tilde{A}+i2\Gamma\tilde{A}^*\tilde{B}\tilde{C}+\sqrt{\kappa}\tilde{A}_{in}, \quad (S25)$$

-continued $$\frac{d\tilde{B}}{dt} = -\frac{\alpha}{2}\tilde{B} - i\tilde{\Delta}_B\tilde{B} + i\Gamma\left(2\tilde{A}^*\tilde{A} + \tilde{B}^*\tilde{B} + 2\tilde{C}^*\tilde{C}\right)\tilde{B} + i\Gamma\tilde{C}^*\tilde{A}^2, \quad \text{(S26)}$$

$$\frac{d\tilde{C}}{dt} = -\frac{\alpha}{2}\tilde{C} - i\tilde{\Delta}_c\tilde{C} + i\Gamma\left(2\tilde{A}^*\tilde{A} + 2\tilde{B}^*\tilde{B} + 2\tilde{C}^*\tilde{C}\right)\tilde{C} + i\Gamma B^*\tilde{A}^2, \quad \text{(S27)}$$

where Ã, B̃, and C̃ are the field amplitudes normalized to photon number in the cavity, $\tilde{\Delta}_A$, $\tilde{\Delta}_B$, and $\tilde{\Delta}_C$ are the (fluctuating) detunings of the pump, signal, and idler fields, respectively, and $A_{in}$ is the pump field in the bus waveguide normalized to photon flux. All the other parameters follow the definition in section. The fields can be similarly decomposed into their mean and fluctuating parts as, $$\tilde{O} = (O + \tilde{u}_o + i\tilde{v}_o)e^{i\phi_o}, \quad \text{(S28)}$$

where $O \in \{A, B, C\}$. A, B, and C correspond to the average amplitude of the fields, $\tilde{u}_a/A$, $\tilde{u}_b/B$, and $\tilde{u}_c/C$ correspond to the relative amplitude noise, and $\tilde{v}_a/A$, $\tilde{v}_b/B$, and $\tilde{v}_c/C$ correspond to the phase noise. In addtiona, we let $\tilde{A}_{in} = (A_{in} + \tilde{u}_{in} + i\tilde{v}_{in})$ and $\tilde{\Delta}_{A,B,C} = \Delta_{A,B,C} + \tilde{\delta}_{a,b,c}$. The mean values follow the same equations as Eq. (S14-S16). Using Eq. (S17-S19) and with some calculation, we can find the difference of signal idler fluctuations as, $$\frac{d}{dt}(\tilde{u}_b - \tilde{u}_c) = -\alpha(\tilde{u}_b - \tilde{u}_c) \quad \text{(S29)}$$

$$\frac{d}{dt}(\tilde{v}_b - \tilde{v}_c) = -(\widetilde{\delta_b}B - \widetilde{\delta_c}C) - 2(BC + A^2\cos\phi)(\tilde{u}_b - \tilde{u}_c), \quad \text{(S30)}$$

where $\phi = 2\phi_A - \phi_B - \phi_C$, and used with Eqs. (S17)-(S20). Equation (S29) indicates $\tilde{u}_b = \tilde{u}_c$ as the amplitude damps without a driving force, which physically corresponds to energy conservation. Thus, using Eq. (S30), the phase difference can be defined as, $$\frac{d}{dt}(\tilde{\phi}_b - \tilde{\phi}_c) = -(\tilde{\delta}_b - \tilde{\delta}_c). \quad \text{(S31)}$$

Equations (S25)-(S27) can also be directly simulated. To generate FIG. 14A, the same cavity parameters can be used as those in FIG. 17. The detuning noise can be considered as $\tilde{\delta}_x = k_x t$, where $x \in \{A, B, C\}$, $k_A$, $k_B$, $k_C$ are constant coefficients, and t is the temperature fluctuation identical to $\Delta T$ in the main text. In addition, the following can be applied:

$$k_A : k_B : k_C = \omega_A : \omega_B : \omega_C, \quad \text{(S32)}$$

with $k_A \tilde{t}$ characterized using the method discussed herein.

To verify Eq. (S31), the stochastic field involution can be directly stimulated using Eqs. (S25)-(S27). The cavity condition and pump power are identical to examples discussed herein. The intensity noise of the pump at the shot-noise level. The phase noise of the pump is a combination of an STL-limited process with a 2-kHz-linewidth and a noise peak at 22-kHz offset frequency. The detuning fluctuations are created piecewise to resemble the experimental characterization using an approach similar to [S2]. In addition, the pump, signal, and idler detuning fluctuations are correlated according to Eq. (S32), and with the simulation results discussed above.

Numerical Model of Synchronization

The model of OPO-soliton synchronization is identical to that for the soliton-soliton synchronization presented in [S3], and defined herein as:

$$\frac{\partial E_1}{\partial t} = \left(-\frac{\alpha}{2} - i\Delta_1 - i\frac{L\mathcal{F}\beta_2}{2}\frac{\partial^2}{\partial\tau^2} + i\gamma L\mathcal{F}|E_1|^2\right)E_1 + \sqrt{\kappa\mathcal{F}}\,E_{in,1}, \quad \text{(S33)}$$

$$\frac{\partial E_2}{\partial t} = \left(-\frac{\alpha}{2} - i\Delta_2 - \tau_d\mathcal{F}\frac{\partial}{\partial\tau} - i\frac{L\mathcal{F}\beta_2}{2}\frac{\partial^2}{\partial\tau^2} + i\gamma L\mathcal{F}|E_2|^2\right)E_2 + \sqrt{\kappa\mathcal{F}}\,E_{in,2} + \theta\mathcal{F}E_1, \quad \text{(S34)}$$

where $E_1$ and $E_2$ are the field envelope in the OPO and soliton-comb cavities, respectively, $\alpha$ is the cavity loss rate, $\Delta_1$ and $\Delta_2$ are the pump detunings of the OPO and soliton-comb cavities, respectively, $\tau_d$ is the difference of the roundtrip time between the cavities, L is the roundtrip length, $\mathcal{F}$ is the free-spectral range (FSR), $\beta_2$ is the GVD coefficient, $\gamma$ is the nonlinear coefficient, $\kappa$ is the pump coupling rate, $\theta$ is the roundtrip coupling coefficient of the coupling link at each coupling point, $E_{in,1}$ and $E_{in,2}$ are the input pump fields of the OPO and soliton cavities, respectively, t is the slow time on the scale of cavity lifetime, and $\tau$ is the fast time on the scale of cavity roundtrip time. Unlike the previous sections, all the fields in this section are normalized to power. The time delay introduced by the coupling link has been ignored and can be incorporated with a frequency-dependent phase term for $\theta$.

The field evolution can be simulated using the split-step Fourier method, and using $\alpha = 2\pi \times 200$ MHz, $\kappa = 2\pi \times 100$ MHz, $\beta_2 = -25$ ps$^2$/km, $\mathcal{F} = 200$ GHz, and $L = 2\pi \times 110$ μm. A pump power of 20 mW and detuning of $2\pi \times 50$ MHz can be used for the OPO, and a pump of 100 mW and a detuning of $2\pi \times 800$ MHz can be used for the soliton. To demonstrate roundtrip-time synchronization, a roundtrip-time difference $\tau_d = 0.02$ fs can be set, which is shown as a drift on the fast-time grid (FIG. 14E). This drift is stopped by introducing a coupling $0 = 0.15\%$, corresponding to a total power coupling of $\theta^2 = 2.25 \times 10^{-6}$ in a roundtrip time.

The suppression of soliton noise can be simulated by introducing a sinusoidal modulation in $\tau_d$, which results in a sinusoidal change of soliton-repetition rate. This change can be read by extracting the phase of the comb line next to the pump, as the phase of the pump mode is constant for all $\tau_d$. The comb line phase can be fit with a sine function to extract the modulation amplitude. By comparing the amplitude with $\theta = 0$ and $\theta \neq 0$, the maximum noise suppression strength can be obtained at a given offset frequency. This method avoids propagation for a long time at small offset frequencies. Simulated variations at frequencies 1 kHz, 3 kHz, 10 kHz, 30 kHz, . . . , 300 MHz, and 1 GHz can show typical results in FIG. 18. The noise suppression factor at an offset frequency is the ratio between the amplitudes with and without synchronization, which reflects the maximum noise-rejection capability when the OPO noise is much lower than the soliton noise. If the OPO noise is above the soliton noise minus the noise-suppression factor, the soliton noise follows the OPO noise after synchronization.

Low-Thermorefractive Noise Design

As shown in Eq. (3), the thermorefractive noise in OPA corresponds to the mismatch between the resonance shift of the signal and idler caused by temperature fluctuations. The resonance frequency ω satisfies $$\frac{n_{eff}\omega L}{c} = 2\pi m \quad (S35)$$

where $n_{eff}$ is the effective index, L is the cavity length, c is the speed of light in vacuum, and m is the resonator mode number. Differentiating Eq. (S35) with respect to the temperature T gets the resonance-shift coefficient, $$k = \frac{d\omega}{dT} = \frac{\omega}{n_g}\frac{dn_{eff}}{dT}, \quad (S36)$$

where $n_g$ is the group index. In a regular silicon-nitride (SiN) waveguide, ω is the dominant term, and k increases as the frequency increases. However, by incorporating a small amount of $TiO_2$, which has a thermorefractive coefficient of $-1\times10^{-4}$ $K^{-1}$, $dn_{eff}/dT$ can be significantly reduced, and its slope increased as a function of wavelength.

Thermorefractive Noise Characterization

Figure 19B:
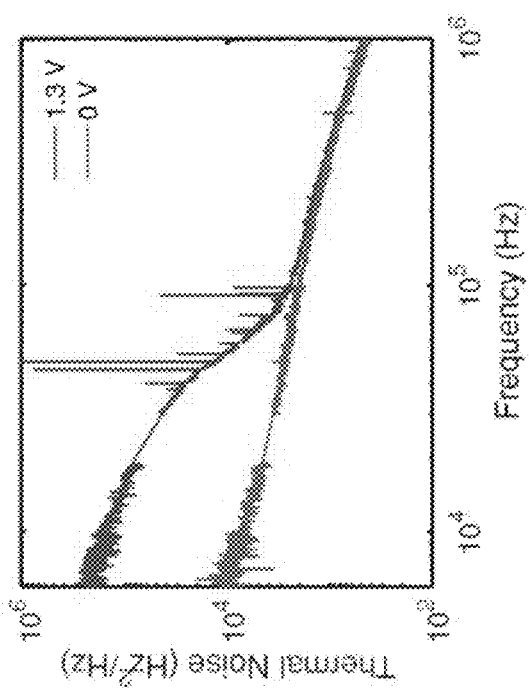
FIG. 19B illustrates measured thermal noise of the SiN device at room temperature (0V) and when a heating voltage is applied using a commercial arbitrary-waveform generator (1.3 V).
Figure 19A:
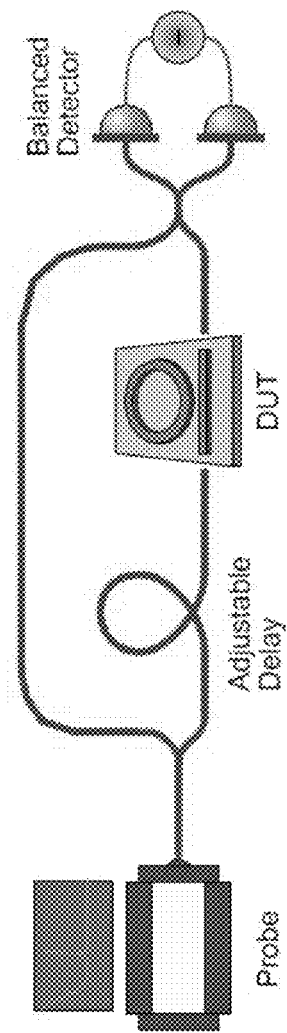
FIG. 19A illustrates a homodyne setup for thermal noise characterization of microresonators. DUT, device under test.

The cavity resonance fluctuation can be characterized using a homodyne system [S4]. As shown in FIG. 19A, the system consists of an MZI and a balanced photodetector. An adjustable delay can help balance the arm lengths of the MZI to an accuracy of a few micrometers. The power can also be attenuated after the adjustable delay to avoid nonlinear phase shift and heating in the device under test (DUT). The MZI is biased such that the powers are balanced on the detector. When the probe beam is in resonance with the microresonator, the intracavity field can be modeled by, $$\frac{d\tilde{A}}{dt} = -\frac{\alpha}{2}\tilde{A} - i\tilde{\delta}\tilde{A} + \sqrt{\kappa}\tilde{A}_{in}, \quad (S37)$$

where $\tilde{A}$ is the intracavity field, α is the loss rate, $\tilde{\delta}$ is the resonance fluctuation, κ is the coupling rate, and $\tilde{A}_{in}$ is the input field. $\tilde{A}_{in}$ and $\tilde{A}$ can be decomposed into their mean and fluctuations as, $$\tilde{A}_{in} = (A_{in} + \tilde{a}_{in})e^{i\tilde{\psi}_{in}}, \quad (S38)$$

$$\tilde{A} + \left(\frac{2\sqrt{\kappa}}{\alpha}A_{in} + \tilde{a}\right)e^{i\tilde{\psi}}. \quad (S39)$$

And up to the first order in small fluctuations, $\tilde{\alpha}$ and $\tilde{\psi}$:

$$\frac{d\tilde{a}}{dt} = -\frac{\alpha}{2}\tilde{a} + \sqrt{\kappa}\tilde{a}_{in}, \quad (S40)$$

$$\frac{d\tilde{\psi}}{dt} = -\frac{\alpha}{2}\tilde{\psi} - \tilde{\delta} + \frac{\alpha}{2}\tilde{\psi}_{in}. \quad (S41)$$

Equations (S40) and (S41) can be solved in the frequency domain, which yields, $$\tilde{a}(\omega) = \frac{2\sqrt{\kappa}}{\alpha - i2\omega}\tilde{a}_{in}, \quad (S42)$$

$$\tilde{\psi}(\omega) = -\frac{2}{\alpha - i2\omega}\tilde{\delta} + \frac{\alpha}{\alpha - i2\omega}\tilde{\psi}_{in}. \quad (S43)$$

The transmitted field has the form of $\tilde{A}_{in}-\sqrt{\kappa}\tilde{A}$ which has a phase term, $$\tilde{\psi}_{out} = \frac{\alpha}{\alpha - 2\kappa}\tilde{\psi}_{in} - \frac{2\kappa}{\alpha - 2\kappa}\tilde{\psi}. \quad (S44)$$

The homodyne output voltage is proportional to the phase difference of the two arms, which has the form, $$\tilde{V} \propto \tilde{\psi}_{in} - \tilde{\psi}_{out} = -\frac{4}{(\alpha - 2\kappa)(\alpha - i2\omega)}\tilde{\delta} - \frac{4}{(\alpha - 2\kappa)(\alpha - i2\omega)}\omega\tilde{\psi}_{in}. \quad (S45)$$

Thus, the power spectrum of $\tilde{V}$ is, $$\mathcal{L}_V \tilde{f} \propto \mathcal{L}_\delta(f) + \mathcal{L}_\omega(f), \quad (S46)$$

where $\mathcal{L}_\delta$ is the frequency noise spectrum of the resonance frequency and $\mathcal{L}_\omega$ is the frequency noise of the laser. This allows an accurate calibration of the proportionality factor between $\mathcal{L}_V$ and $\mathcal{L}_\delta$ by introducing a high-noise tone in the probe laser. This tone can be accurately measured using the heterodyne scheme in FIG. 13D, and all other frequency components in $\mathcal{L}_V$ can be calibrated with this tone. FIG. 19B shows the measured thermorefractive noise of the 227-GHz silicon nitride ring, which agrees with previous experiments. In an experiment, a 1.3-V voltage is applied to the soliton ring which is required for matching the resonances of the two rings to the same pump. The commercial arbitrary-waveform generated used to supply this voltage adds additional noise as shown in the blue trace.

REFERENCES

E. Ivanov, M. Tobar, and R. Woode, Ultra-low-noise microwave oscillator with advanced phase noise suppression system, IEEE Microwave Guided Wave Lett. 6, 312 (1996).

P. Kinget, Integrated GHz voltage controlled oscillators, in Analog Circuit Design: (X)DSL and other Communication Systems; RF MOST Models; Integrated Filters and Oscillators, edited by W. Sansen, J. Huijsing, and R. van de Plassche (Springer US, Boston, MA, 1999) pp. 353-381.

B. Razavi, Design of millimeter-wave CMOS radios: A tutorial, IEEE Trans. Circuits Syst. 56, 4 (2009).

T. S. Rappaport, J. N. Murdock, and F. Gutierrez, State of the art in 60-GHz integrated circuits and systems for wireless communications, Proc. IEEE 99, 1390 (2011).

J. T. M. van Beek and R. Puers, A review of MEMS oscillators for frequency reference and timing applications, J. Micromech. Microeng. 22, 013001 (2011).

A. Madjar and T. Berceli, Microwave generation by optical techniques—a review, in Proc. Eur. Microw. Conf. (2006) pp. 1099-1102.

L. Maleki, The optoelectronic oscillator, Nat. Photonics 5, 728 (2011).

J. Li, X. Yi, H. Lee, S. A. Diddams, and K. J. Vahala, Electro-optical frequency division and stable microwave synthesis, Science 345, 309 (2014).

A. D. Ludlow, M. M. Boyd, J. Ye, E. Peik, and P. O. Schmidt, Optical atomic clocks, Rev. Mod. Phys. 87, 637 (2015).

T. Bothwell, D. Kedar, E. Oelker, J. M. Robinson, S. L. Bromley, W. L. Tew, J. Ye, and C. J. Kennedy, JILA SrI optical lattice clock with uncertainty of 2.0×10-18, Metrologia 56, 065004 (2019).

T. Tetsumoto, T. Nagatsuma, M. E. Fermann, G. Navickaite, M. Geiselmann, and A. Rolland, Optically referenced 300 GHz millimetre-wave oscillator, Nat. Photonics 15, 516 (2021).

T. M. Fortier, M. S. Kirchner, F. Quinlan, J. Taylor, J. C. Bergquist, T. Rosenband, N. Lemke, A. Ludlow, Y. Jiang, C. W. Oates, and S. A. Diddams, Generation of ultrastable microwaves via optical frequency division, Nat. Photonics 5, 425 (2011).

J. Liu, E. Lucas, A. S. Raja, J. He, J. Riemensberger, R. N. Wang, M. Karpov, H. Guo, R. Bouchand, and T. J. Kippenberg, Photonic microwave generation in the X- and K-band using integrated soliton microcombs, Nat. Photonics 14, 486 (2020).

W. Weng, A. Kaszubowska-Anandarajah, J. Liu, P. M. Anandarajah, and T. J. Kippenberg, Frequency division using a soliton-injected semiconductor gain-switched frequency comb, Sci-ence Advances 6, eaba2807 (2020).

A. Coillet and Y. Chembo, On the robustness of phase locking in kerr optical frequency combs, Opt. Lett. 39, 1529 (2014).

T. E. Drake, J. R. Stone, T. C. Briles, and S. B. Papp, Thermal decoherence and laser cooling of Kerr microresonator solitons, Nat. Photonics 14, 480 (2020).

A. B. Matsko and L. Maleki, Noise conversion in Kerr comb RF photonic oscillators, J. Opt. Soc. Am. B 32, 232 (2015).

X. Yi, Q. F. Yang, X. Zhang, K. Y. Yang, X. Li, and K. Vahala, Single-mode dispersive waves and soliton microcomb dynamics, Nat. Commun. 8, 10.1038/ncomms14869 (2017).

Q.-F. Yang, Q.-X. Ji, L. Wu, B. Shen, H. Wang, C. Bao, Z. Yuan, and K. Vahala, Dispersive-wave induced noise limits in miniature soliton microwave sources, Nat. Commun. 12, 1442 (2021).

C. Bao, Y. Xuan, C. Wang, J. A. Jaramillo-Villegas, D. E. Leaird, M. Qi, and A. M. Weiner, Soliton repetition rate in a silicon-nitride microresonator, Opt. Lett. 42, 759 (2017).

W. Weng, M. H. Anderson, A. Siddharth, J. He, A. S. Raja, and T. J. Kippenberg, Coher-ent terahertz-to-microwave link using electro-optic-modulated turing rolls, Phys. Rev. A 104, 023511 (2021).

J. Courtois, A. Smith, C. Fabre, and S. Reynaud, Phase diffusion and quantum noise in the optical parametric oscillator: A semiclassical approach, J. Mod. Opt. 38, 177 (1991).

E. Kenig, M. C. Cross, R. Lifshitz, R. B. Karabalin, L. G. Villanueva, M. H. Matheny, and M. L. Roukes, Passive phase noise cancellation scheme, Phys. Rev. Lett. 108, 264102 (2012).

B. Guha, J. Cardenas, and M. Lipson, Athermal silicon microring resonators with titanium oxide cladding, Opt. Express 21, 26557 (2013).

S. S. Djordjevic, K. Shang, B. Guan, S. T. S. Cheung, L. Liao, J. Basak, H.-F. Liu, and S. J. B. Yoo, CMOS-compatible, athermal silicon ring modulators clad with titanium dioxide, Opt. Express 21, 13958 (2013).

J. R. Rodrigues, G. R. Bhatt, I. Datta, U. D. Dave, S. Chaitanya, E. Shim, and M. Lipson, SiN-based waveguides with ultra-low thermo-optic effect, in Conference on Lasers and Electro-Optics (Optica Publishing Group, 2022) p. SM4G.3.

L. Di'osi, Laser linewidth hazard in optomechanical cooling, Phys. Rev. A 78, 021801 (2008).

A. H. Safavi-Naeini, J. Chan, J. T. Hill, S. Gr"oblacher, H. Miao, Y. Chen, M. Aspelmeyer, and O. Painter, Laser noise in cavity-optomechanical cooling and thermometry, New J. Phys. 15, 035007 (2013).

X. Sun, R. Luo, X.-C. Zhang, and Q. Lin, Squeezing the fundamental temperature fluctuations of a high-q microresonator, Phys. Rev. A 95, 023822 (2017).

Y. Yamamoto and H. A. Haus, Commutation relations and laser linewidth, Phys. Rev. A 41, 5164 (1990).

J. K. Jang, A. Klenner, X. Ji, Y. Okawachi, M. Lipson, and A. L. Gaeta, Synchronization of coupled optical microresonators, Nat. Photonics 12, 688 (2018).

J. K. Jang, X. Ji, C. Joshi, Y. Okawachi, M. Lipson, and A. L. Gaeta, Observation of arnold tongues in coupled soliton kerr frequency combs, Phys. Rev. Lett. 123, (2019).

B. Y. Kim, J. K. Jang, Y. Okawachi, X. Ji, M. Lipson, and A. L. Gaeta, Synchronization of nonsolitonic Kerr combs, Sci. Adv. 7, eabi4362 (2021).

Y. K. Chembo and N. Yu, Modal expansion approach to optical-frequency-comb generation with monolithic whispering-gallery-mode resonators, Phys. Rev. A 82, 033801 (2010).

S. Coen and M. Erkintalo, Universal scaling laws of kerr frequency combs, Opt. Lett. 38, 1790 (2013).

C. Godey, I. V. Balakireva, A. Coillet, and Y. K. Chembo, Stability analysis of the spatiotem-poral lugiato-lefever model for kerr optical frequency combs in the anomalous and normal dispersion regimes, Phys. Rev. A 89, 063814 (2014).

M. Merklein, B. Stiller, I. V. Kabakova, U. S. Mutugala, K. Vu, S. J. Madden, B. J. Eggleton, and R. Slav'ik, Widely tunable, low phase noise microwave source based on a photonic chip, Opt. Lett. 41, 4633 (2016).

J. Tang, T. Hao, W. Li, D. Domenech, R. B. nos, P. M. noz, N. Zhu, J. Capmany, and M. Li, Integrated optoelectronic oscillator, Opt. Express 26, 12257 (2018).

P. T. Do, C. Alonso-Ramos, X. Le Roux, I. Ledoux, B. Journet, and E. Cassan, Wideband tunable microwave signal generation in a silicon-micro-ring-based optoelectronic oscillator, Sci. Rep. 10, 1 (2020).

J. Li, H. Lee, and K. J. Vahala, Microwave synthesizer using an on-chip Brillouin oscillator, Nat. Commun. 4, 2097 (2013).

S. Gundavarapu, G. M. Brodnik, M. Puckett, T. Huffman, D. Bose, R. Behunin, J. Wu, T. Qiu, C. Pinho, N. Chauhan, J. Nohava, P. T. Rakich, K. D. Nelson, M. Salit, and D. J. Blumenthal, Sub-hertz fundamental linewidth photonic integrated Brillouin laser, Nat. Photonics 13, 60 (2019).

J. Li and K. Vahala, Small-sized, ultra-low phase noise photonic microwave oscillators at X-Ka bands, Optica 10, 33 (2023).

M. Kalubovilage, M. Endo, and T. R. Schibli, X-Band photonic microwaves with phase noise below −180 dBc/Hz using a free-running monolithic comb, Opt. Express 30, 11266 (2022).

D. Kwon, C.-G. Jeon, J. Shin, M.-S. Heo, S. E. Park, Y. Song, and J. Kim, Reference-free, high-resolution measurement method of timing jitter spectra of optical frequency combs, Sci. Rep. 7, 1 (2017).

H. Tian, W. Yang, D. Kwon, R. Li, Y. Zhao, J. Kim, Y. Song, and M. Hu, Optical frequency comb noise spectra analysis using an asymmetric fiber delay line interferometer, Opt. Express 28, 9232 (2020).

M. L. Gorodetksy, A. Schliesser, G. Anetsberger, S. Deleglise, and T. J. Kippenberg, Deter-mination of the vacuum optomechanical coupling rate using frequency noise calibration, Opt. Express 18, 23236 (2010).

G. Huang, E. Lucas, J. Liu, A. S. Raja, G. Lihachev, M. L. Gorodetsky, N. J. Engelsen, and T. J. Kippenberg, Thermorefractive noise in silicon-nitride microresonators, Phys. Rev. A 99, 061801 (2019).

C. Joshi, J. K. Jang, K. Luke, X. Ji, S. A. Miller, A. Klenner, Y. Okawachi, M. Lipson, and A. L. Gaeta, Thermally controlled comb generation and soliton modelocking in microresonators, Opt. Lett. 41, 2565 (2016).

V. Raghunathan, W. N. Ye, J. Hu, T. Izuhara, J. Michel, and L. Kimerling, Athermal operation of Silicon waveguides: spectral, second order and footprint dependencies, Opt. Express 18, 17631 (2010).

M. Kalubovilage, M. Endo, and T. R. Schibli, Ultra-low phase noise microwave generation with a free-running monolithic femtosecond laser, Opt. Express 28, 25400 (2020).

X. Xie, R. Bouchand, D. Nicolodi, M. Giunta, W. Hansel, M. Lezius, A. Joshi, S. Datta, C. Alexandre, M. Lours, P.-A. Tremblin, G. Santarelli, R. Holzwarth, and Y. Le Coq, Photonic microwave signals with zeptosecond-level absolute timing noise, Nat. Photonics 11, 44 (2017).

J. K. Jang, Y. Okawachi, Y. Zhao, X. Ji, C. Joshi, M. Lipson, and A. L. Gaeta, Conversion efficiency of soliton kerr combs, Opt. Lett. 46, 3657 (2021).

N. Kondratiev, V. Lobanov, N. Dmitriev, S. Cordette, and I. Bilenko, Detailed analysis of ultimate soliton microcomb generation efficiency, arXiv:2209.03707 (2022).

G. D. Domenico, S. Schilt, and P. Thomann, Simple approach to the relation between laser frequency noise and laser line shape, Appl. Opt. 49, 4801 (2010).

J. Timmer and M. Koenig, On generating power law noise, Astron. Astrophys. 300, 707 (1995).

J. K. Jang, A. Klenner, X. Ji, Y. Okawachi, M. Lipson, and A. L. Gaeta, Synchronization of coupled optical microresonators, Nat. Photonics 12, 688 (2018).

M. L. Gorodetksy, A. Schliesser, G. Anetsberger, S. Deleglise, and T. J. Kippenberg, Deter-mination of the vacuum optomechanical coupling rate using frequency noise calibration, Opt. Express 18, 23236 (2010).

G. Huang, E. Lucas, J. Liu, A. S. Raja, G. Lihachev, M. L. Gorodetsky, N. J. Engelsen, and T. J. Kippenberg, Thermorefractive noise in silicon-nitride microresonators, Phys. Rev. A 99, 061801 (2019).

Embodiments

The following Embodiments are illustrative only and do not limit the scope of the present disclosure or the appended claims. Any part or parts of any one or more Embodiments can be combined with any part or parts of any one or more other Embodiments.

Embodiment 1. A method for generating tunable, low frequency signals, comprising: receiving a light input on a device, wherein the light input comprises a plurality of frequencies, and the device comprises a first waveguide in optical communication with a first ring resonator, and a second waveguide in optical communication with a second ring resonator; pumping the light input through the first waveguide to generate a first frequency and a second frequency via optical parametric oscillation (OPO); pumping the first frequency and the second frequency through the second waveguide to optically synchronize the frequencies via optical frequency division (OFD); generating a synchronized low frequency signal; and thermally tuning at least one of the first ring resonator and the second ring resonator to reduce noise associated with the low frequency signal.

Embodiment 2. The method of Embodiment 1, wherein the light input is a laser.

Embodiment 3. The method of any one of Embodiments 1-2, wherein OPO comprises continuously tuning a resonator via one or more connected heating elements.

Embodiment 4. The method of any one of Embodiments 1-3, wherein OFD divides a frequency difference between the first and second frequency to reduce pump fluctuations and thermorefractive noise.

Embodiment 5. The method of Embodiment 4, wherein OFD divides a frequency difference between the first and second frequency to reduce pump fluctuations and thermorefractive noise.

Embodiment 6. The method of any one of Embodiments 1-5, further comprising: modulating a cross-section of at least one waveguide to adjust at least one of the first frequency, the second frequency, and a bandwidth.

Embodiment 7. The method of any one of Embodiments 1-6, wherein the first waveguide has a greater mode spacing than the second waveguide.

Embodiment 8. The method of any one of Embodiments 1-7, wherein at least one of the first waveguide and the second waveguide is a soliton mode-locked Kerr comb.

Embodiment 9. The method of any one of Embodiments 1-8, wherein the first waveguide and the second waveguide each comprise a plurality of ring resonators.

Embodiment 10. The method of Embodiment 9, wherein each of the plurality of ring resonators are connected to at least one heating element.

Embodiment 11. The method of any one of Embodiments 1-10, wherein the first frequency is a signal and the second frequency is an idler.

Embodiment 12. A system for generating tunable, low frequency signals, comprising: a first waveguide in optical communication with a first ring resonator, the first waveguide configured to receive a light input and generate a first frequency and a second frequency via optical parametric oscillation; a second waveguide in optical communication with a second ring resonator, the second waveguide configured to receive the first frequency and the second frequency and optically synchronize the frequencies via optical frequency division, and generate a low frequency signal; and at least one heating element configured to thermally tune at least one of the first ring resonator and the second ring resonator so as to reduce noise associated with the low frequency signal.

Embodiment 13. The system of Embodiment 12, further comprising a chip on which the first waveguide, the second waveguide, and the at least one heating element reside.

Embodiment 14. The system of any one of Embodiments 12-13, wherein the light input is at least one of a continuous wave laser and a pump laser.

Embodiment 15. The system of any one of Embodiments 12-14, wherein OPO comprises continuously tuning a resonator via one or more connected heating elements.

Embodiment 16. The system of any one of Embodiments 12-15, wherein OFD divides a frequency difference between the first and second frequency to reduce pump fluctuations and thermorefractive noise.

Embodiment 17. The system of any one of Embodiments 12-16, wherein the thermorefractive noise is reduced relative to a square of a frequency division factor.

Embodiment 18. The system of any one of Embodiments 12-17, wherein at least one of the first waveguide and the second waveguide are configured to modulate a cross-section to adjust at least one of the first frequency, the second frequency, and a bandwidth.

Embodiment 19. The system of any one of Embodiments 12-18, wherein the first waveguide has a greater mode spacing than the second waveguide.

Embodiment 20. The system of any one of Embodiments 12-20, wherein the first waveguide and the second waveguide each comprise a plurality of ring resonators, and each ring resonator is connected to the at least one heating element.

Embodiment 21. A method, comprising making the system of any one of Embodiments 12-20.

Embodiment 22. A method, comprising using the system of any one of Embodiments 12-20. Such use can be, for example, to transmit and/or receive a signal.

What is claimed:

1. A method for generating tunable, low frequency signals, comprising:
   receiving a light input on a device, wherein the light input comprises a plurality of frequencies, and the device comprises a first waveguide in optical communication with a first ring resonator, and a second waveguide in optical communication with a second ring resonator;
   pumping the light input through the first waveguide to generate a first frequency and a second frequency via optical parametric oscillation (OPO);
   pumping the first frequency and the second frequency through the second waveguide to optically synchronize the frequencies via optical frequency division (OFD);
   generating a synchronized low frequency signal; and
   thermally tuning at least one of the first ring resonator and the second ring resonator to reduce noise associated with the low frequency signal.

2. The method of claim 1, wherein the light input is a laser.

3. The method of claim 1, wherein OPO comprises continuously tuning a resonator via one or more connected heating elements.

4. The method of claim 1, wherein OFD divides a frequency difference between the first and second frequency to reduce pump fluctuations and thermorefractive noise.

5. The method of claim 4, wherein OFD divides a frequency difference between the first and second frequency to reduce pump fluctuations and thermorefractive noise.

6. The method of claim 1, further comprising: modulating a cross-section of at least one waveguide to adjust at least one of the first frequency, the second frequency, and a bandwidth.

7. The method of claim 1, wherein the first waveguide has a greater mode spacing than the second waveguide.

8. The method of claim 1, wherein at least one of the first waveguide and the second waveguide is a soliton mode-locked Kerr comb.

9. The method of claim 1, wherein the first waveguide and the second waveguide each comprise a plurality of ring resonators.

10. The method of claim 9, wherein each of the plurality of ring resonators are connected to at least one heating element.

11. The method of claim 1, wherein the first frequency is a signal and the second frequency is an idler.

12. A system for generating tunable, low frequency signals, comprising:
   a first waveguide in optical communication with a first ring resonator, the first waveguide configured to receive a light input and generate a first frequency and a second frequency via optical parametric oscillation;
   a second waveguide in optical communication with a second ring resonator, the second waveguide configured to receive the first frequency and the second frequency and optically synchronize the frequencies via optical frequency division, and generate a low frequency signal; and
   at least one heating element configured to thermally tune at least one of the first ring resonator and the second ring resonator so as to reduce noise associated with the low frequency signal.

13. The system of claim 12, further comprising a chip on which the first waveguide, the second waveguide, and the at least one heating element reside.

14. The system of claim 12, wherein the light input is at least one of a continuous wave laser and a pump laser.

15. The system of claim 12, wherein OPO comprises continuously tuning a resonator via one or more connected heating elements.

16. The system of claim 12, wherein OFD divides a frequency difference between the first and second frequency to reduce pump fluctuations and thermorefractive noise.

17. The system of claim 12, wherein the thermorefractive noise is reduced relative to a square of a frequency division factor.

18. The system of claim 12, wherein at least one of the first waveguide and the second waveguide are configured to modulate a cross-section to adjust at least one of the first frequency, the second frequency, and a bandwidth.

19. The system of claim 12, wherein the first waveguide has a greater mode spacing than the second waveguide.

20. The system of claim 12, wherein the first waveguide and the second waveguide each comprise a plurality of ring resonators, and each ring resonator is connected to the at least one heating element.

* * * * *